United States Patent
Ono et al.

(10) Patent No.: US 7,608,349 B2
(45) Date of Patent: Oct. 27, 2009

(54) POLYESTER FILM FOR RECORDING MEDIUM AND MAGNETIC RECORDING TAPE

(75) Inventors: Masaaki Ono, Anpachi-gun (JP); Kazuyoshi Fukata, Kusatsu (JP); Masahiro Yagi, Otsu (JP)

(73) Assignee: Toray Industries, Inc. (JP)

( * ) Notice: Subject to any disclaimer, the term of this patent is extended or adjusted under 35 U.S.C. 154(b) by 433 days.

(21) Appl. No.: 10/544,446

(22) PCT Filed: Feb. 4, 2004

(86) PCT No.: PCT/JP2004/001097

§ 371 (c)(1),
(2), (4) Date: Aug. 4, 2005

(87) PCT Pub. No.: WO2004/070713

PCT Pub. Date: Aug. 19, 2004

(65) Prior Publication Data

US 2006/0147762 A1 Jul. 6, 2006

(30) Foreign Application Priority Data

Feb. 7, 2003 (JP) .............................. 2003-030625

(51) Int. Cl.
*G11B 5/00* (2006.01)
*G11B 3/00* (2006.01)

(52) U.S. Cl. .............. 428/847.2; 428/847.3; 428/847.6; 428/147

(58) Field of Classification Search ............... 428/832.4, 428/838, 844, 847.2, 847.3, 847.6, 847.7, 428/847.8, 840, 480, 141; 264/266; 522/104, 522/116; 521/52
See application file for complete search history.

(56) References Cited

U.S. PATENT DOCUMENTS

| 4,732,814 | A | * | 3/1988 | Hatada et al. | ................ | 428/480 |
| 5,110,834 | A | * | 5/1992 | Horn et al. | .................... | 521/52 |
| 5,188,774 | A | * | 2/1993 | Nitta et al. | .................. | 264/466 |
| 6,242,077 | B1 | * | 6/2001 | Tojo et al. | ................... | 428/141 |
| 6,617,006 | B1 | * | 9/2003 | Kubo et al. | ................. | 428/141 |
| 6,686,405 | B1 | * | 2/2004 | Kawahara et al. | ........... | 524/127 |
| 2002/0114977 | A1 | * | 8/2002 | Kubota et al. | ............... | 428/840 |
| 2003/0017366 | A1 | * | 1/2003 | Takahashi et al. | ........... | 428/438 |

FOREIGN PATENT DOCUMENTS

| EP | 1 047 048 A1 | 10/2000 |
| JP | 2002 363310 | 11/1999 |
| JP | 2003 025526 | 1/2003 |
| JP | 2003 346326 | 12/2003 |
| WO | WO01/49778 | * 7/2001 |

* cited by examiner

*Primary Examiner*—Kevin M. Bernatz
*Assistant Examiner*—Louis Falasco
(74) *Attorney, Agent, or Firm*—DLA Piper LLP (US)

(57) ABSTRACT

A polyester film for recording medium, having one major surface thereof provided with a coating layer containing fine particles of 5 to 60 nm diameter and an organic compound, wherein the number of fine surface projections existing on the surface of the coating layer is in the range of 3 million to 100 million/mm$^2$, and the number of surface defects of 120 nm or greater height attributed to foreign matter contained in the film is 30/100 cm$^2$ or less, and wherein the polyester contains a titanium compound substantially not having any particle diameter. Thus, there are provided a magnetic recording tape for digital data recording that can reduce dropouts and excels in durability, and further provided a polyester film that is suitable as a base film thereof.

7 Claims, No Drawings

POLYESTER FILM FOR RECORDING MEDIUM AND MAGNETIC RECORDING TAPE

TECHNICAL FIELD

This disclosure relates to a polyester film for recording medium, specifically, to a polyester film for magnetic recording medium suitable to improve an image quality for a long time and reduce error rate of a ferromagnetic metal thin layer-type magnetic recording medium recording digital data such as a digital video cassette tape or a data storage tape, and a magnetic recording tape using it as a base film.

BACKGROUND

A domestic digital video tape, which was put to practical use in 1995, is provided with a Co metal magnetic thin layer by a vacuum deposition on one surface of a base film having a thickness of 6 to 7 μm, on the surface thereof a diamond-like carbon layer is coated, and it has one hour recording time as a basic specification (SD specification) in a case of a camera integral type video using a DV minicassette.

This digital video cassette (DVC) is a first digital video cassette in the world for domestic use, and it has merits such as (a) it can record enormous information in spite of small body, (b) image and sound qualities do not deteriorate for years because its signal does not deteriorate, (c) high image and sound qualities can be enjoyed because it does not receive disturbance of noise, and (d) its image does not deteriorate even if dubbing is repeated, and therefore, it is highly evaluated in the market.

Further, DVCAM format of the same tape width (¼ inch), which realized high image quality and high reliability required for business use by using the above-described domestic DV format as the base, using a deposition-type digital video tape, increasing the tape running speed by 1.5 times, and widening the width of the recording track from 10 μm to 15 μm, was developed in 1996. The DVCAM format has been evaluated very highly as a business-use VTR realizing high image quality, high sound quality, small size and light weight and excellent in properties for business use such as dubbing property and high level editorial performance in the fields of companies, productions, cable televisions and video journalists.

As base films of such digital video tapes, films such as the following films have been used.

① a polyester film which comprises a polyester film, and a discontinuous skin layer contacted on at least one surface of the film containing a polymer blend material and fine particles with a particle diameter of 50 to 500 Å as its main constituent, and in which a water soluble polyester copolymer is contained in the discontinuous skin layer and fine projections are formed on the discontinuous skin layer (for example, JP-B-SHO 63-57238), and ② a composite film in which layer A composed of a thermoplastic resin and layer B composed of a thermoplastic resin containing fine particles are laminated (for example, JP-B-HEI 1-26338)

In such base films, however, problems are liable to occur such as a problem that foreign matters exist in a polyester used for forming a film, a problem that scratches are generated during a process for film formation, and a problem that surface defects are generated by surface contaminated substances adhered during a process for film formation, and the dropout (DO) of magnetic tapes made from the base films is liable to increase.

For the purpose of giving a polyester film for magnetic recording medium which becomes a DVC tape with less dropout, a polyester film for magnetic recording medium is proposed, which is a polyester film having one major surface A provided with fine surface projections with a height of 10 to 50 nm at a number of 3 million to 90 million/mm$^2$, and in which the number of surface projections with a height of 50 to 120 nm existing on the surface A of the polyester film is 40,000/mm$^2$ or less, and the number of surface defects with a height of 120 nm or more is 400/100 cm$^2$ or less (JP-A-2000-25105).

Further, a polyester film for magnetic recording medium is proposed, which is a polyester film having one major surface A provided with fine surface projections with a height of 10 to 50 nm at a number of 3 million to 90 million/mm$^2$, and in which the number of surface projections with a height of 50 to 120 nm existing on the surface A of the polyester film is 1,000/mm$^2$ or less, the number of surface defects is 1,000/mm$^2$ or less, and the sum of the numbers of surface projections and surface defects with a height more than 120 nm is 400/100 cm$^2$ or less (JP-A-2002-50028).

In a magnetic tape made from such a conventional base film, however, although dropout (DO) was decreased as a DVC tape and the number of dropouts for one minute was achieved to be almost zero, in a case where it was used for use of DVCAM capable of recording for three hours as a standard tape, about 10 dropouts were liable to occur in the three hour recording. In a case used for business use, it is desirable that there is no dropout over the entire length of the tape, and it has been strongly required that the number of dropouts is suppressed to be 2 or less for 3 hours, preferably, to be zero. It has been recognized that the DO is caused by surface defects originating from foreign matters in a film with a height of 120 nm or more, which exist on the surface of the base film of the DVCAM magnetic tape, and by surface adhered substances originating from catalyst residuals of polyester precipitated in a process for producing a polyester film, in particular, in an extrusion process.

On the other hand, the domestic digital video tape, which was put to practical use in 1995, is produced by providing a Co metal magnetic thin layer on one surface of a base film by a vacuum deposition, coating a diamond-like carbon layer on the surface thereof, providing a lubricant layer thereon by coating, and providing a back coat layer on an opposite surface of the base film in order to ensure the running property and durability of the tape in a video tape recorder. This digital video tape has a good durability in spite of having a surface further flattened as compared with that of ME tape for Hi8 (deposited tape).

As the base film of such a digital video tape, films such as the following films have been used.

③ a composite film which comprises a polyester film and a discontinuous skin layer brought into contact with at least one surface of the film, and in which fine particles exist in the discontinuous skin layer and on the surface of the skin layer (for example, JP-B-SHO 62-30105), ④ a composite film in which layer A composed of a thermoplastic resin and layer B composed of a thermoplastic resin containing fine particles are laminated (for example, JP-B-HEI 1-26338), and ⑤ a film formed with a cover layer containing slipping agent as its main constituent on a surface of a non-magnetic surface side of a flat polyester film (for example, JP-A-SHO 57-195321, JP-B-HEI 1-49116 and JP-B-HEI 4-33273)

In such base films, the surface roughness of the metal magnetic layer forming surface side is designed to be further smaller as compared with that in a base film for Hi8ME tape.

However, in the domestic digital video tape thus having a very flat magnetic surface, the electromagnetic conversion property varies very greatly depending on a variation of the surface property of the magnetic surface, and the dropout (DO) property of the obtained tape varies very greatly depending on the influence of foreign matters adhered to a cooling can in a deposition process.

Namely, when the aforementioned ③ film is used as a base film for providing a ferromagnetic metal thin layer for a digital video tape by vacuum deposition, although a good high-density magnetic recording property can be obtained, the handling property is not good, and therefore, it is not suitable for mass production. A tape made from the aforementioned ④ film has a great dispersion of surface undulation of the magnetic surface of the tape, and there is a problem that the dispersion of the electromagnetic conversion property becomes great. Further, in a case where the aforementioned ⑤ film is used, the cover layer containing lubricant as its main constituent on a surface of a non-magnetic surface side is liable to be chipped or delaminated in a deposition process, in particular, by a cooling can of vacuum deposition, thereby increasing DO.

For the purpose of giving a polyester film for magnetic recording medium, wherein soil adhered to a cooling can in a vacuum deposition process is little, and surface undulation of a magnetic tape obtained by vacuum deposition is small, which can be formed into a magnetic tape having a good electromagnetic conversion property, and which is good in handling property and suitable for mass production, JP-A-HEI 10-172127 proposes a polyester film for magnetic recording medium wherein SRa value of one surface A of a polyester film is in a range of 2 to 4 nm, SRz value thereof is in a range of 10 to 40 nm, SRa value of the other surface B is in a range of 5 to 15 nm, SRz value thereof is in a range of 50 to 250 nm, a cover layer with a good slipping property formed by coating does not exist at a position outside of the surface B, the number of projections with a height of 540 nm or more is in a range of 2 to 20/100 cm$^2$, and a ferromagnetic metal thin layer is provided at a position outside of the surface A.

However, very favorable comments are given to the domestic digital video tape, it is desired that more tapes are provided to the market in the world, and therefore, so as to produce more digital video tapes by a single deposition operation, it has been carried out to increase the length of a base film wound on a roll up to 15,000 m or more, further, to 20,000 m or more, as compared with the conventional length of 12,000 m or less.

Further, increase of the deposition speed at the time of producing a magnetic tape has been carried out, and the production amount of digital video tapes per one day has been increased. In order to increase the deposition speed, a greater amount of Co metal thin layer must be provided to a surface of a base film within a constant time, a quantity of heat escaped from a base film to a cooling can at the time of vacuum deposition must be increased, and the temperature of the base film is liable to go up. Therefore, in a case where a base film disclosed in JP-A-HEI 10-172127 is used and a domestic digital video tape is produced at an increased deposition speed, it has been recognized that decomposed substances of a polyester film are likely to be precipitated from the surface B of the film, the decomposed substances transfer to the side of a deposition surface, the electromagnetic conversion property of a produced digital video tape is not good and dropouts is liable to increase.

As base films for preventing this precipitation of decomposed substances of polyester from the surface B, films such as the following films are proposed.

⑥ a polyester film in which a cover layer with a thickness of 1 to 10 nm formed by coating is provided at a position outside of the surface B (for example, JP-A-2002-140812), ⑦ a polyester film which comprises a polyester layer A and a layer B laminated on one surface of the layer A, and in which the content of a cyclic trimer of the polyester of the layer B is 0.8 wt % or less, and the carboxy concentration thereof is 35 equivalent/t or less (for example, JP-A-2002-248723), and ⑧ a polyester film which comprises a polyester layer A and a layer B laminated on one surface of the layer A, and in which the intrinsic viscosity (IV) of the polyester of the layer B is 0.55 or more, and the carboxy concentration thereof is 36 equivalent/t or more (for example, JP-A-2002-248726)

However, in a case where these base films are films with a winding length of 15,000 m or more, when the films immediately after production are used as base films for digital video tapes, the precipitation of decomposed substances of a polyester film from the film surface B at the time of vacuum deposition is little, the electromagnetic conversion property of a produced digital video tape is good and dropouts are few. However, accompanying with expiration of time after film production, foreign matters such as a low-molecular material (an oligomer) of polyester remarkably precipitate onto the surface B over an area from an intermediate position of the winding of the product of the base film to the core portion of the winding. Because the foreign matters such as an oligomer are transferred onto the surface A, after a ferromagnetic thin layer is formed on the layer A by vacuum deposition, the electromagnetic conversion property of the produced digital video tape becomes bad. It has been recognized that this problem is revealed as a phenomenon that, in a case where the lead time from the film production to the vacuum deposition is long to be three months or more, dropouts are liable to increase in a digital video tape produced using such a base film.

Accordingly, it could be helpful to provide a polyester film for magnetic recording medium which can produce a deposition-type magnetic tape for DVCAM having very few dropouts.

Further, it could be helpful to provide a polyester film for recording medium wherein a polyester film of a long roll product with a winding length of 15,000 m or more is used as a base film, deposition is carried out at an increased deposition speed, even if a thermal load applied to the base film at the time of deposition increases, precipitation of decomposed substances of polyester from film surface B does not occur, a cooling can does not soil, and even if the lead time from film production to vacuum deposition becomes long to be three months or more, foreign matters such as oligomer do not precipitate over the entire length of the product from a winding start position, through an intermediate position, to a winding core position of the film roll product, the electromagnetic conversion property of the produced digital video tape is good, and a digital video tape with few dropouts can be produced.

SUMMARY

We thus provide the following polyester film for recording medium and magnetic recording tape.

1. A polyester film for recording medium, having one major surface thereof provided with a coating layer containing fine particles with a particle diameter of 5 to 60 nm and an organic compound, wherein a number of fine surface projections existing on a surface of the coating layer is in a range of 3 million to 100 million/mm², and a number of surface defects with a height of 120 nm or greater attributed to foreign matter contained in the film is 30/100 cm² or less, and wherein a polyester of the polyester film contains a titanium compound substantially not having any particle diameter (a polyester film for recording medium according to a first aspect).

2. The polyester film for recording medium, described above, wherein the polyester contains the titanium compound at a content of 2 to 6 ppm as a titanium atom equivalent relative to polyester and a phosphorus compound at a content of 0.2 to 9 ppm as a phosphorus atom equivalent relative to polyester, a content of an antimony compound is in a range of 0 to 2 ppm at an antimony atom equivalent relative to polyester, a content of a germanium compound is in a range of 0 to 2 ppm at a germanium atom equivalent relative to polyester, and a ratio of a content of the titanium compound to a content of the phosphorus compound is in a range of 0.7 to 10 at a molar ratio (Ti/P) of titanium atom to phosphorus atom.

3. The polyester film for recording medium, described above, wherein a thickness of the film is less than 9.0 µm.

4. The polyester film for recording medium, described above, wherein the polyester is polyethylene terephthalate or polyethylene-2,6-naphthalate.

5. The polyester film for recording medium, described above, wherein the film is used for a magnetic tape of a digital recording system.

6. A magnetic recording tape wherein a ferromagnetic metal thin layer is provided on a surface of the coating layer of the above-described polyester film.

Further, to achieve the above-described first object, we provide the following polyester film for recording medium and magnetic recording tape.

7. A polyester film for recording medium, having one major surface thereof provided with a coating layer containing fine particles and an organic compound, wherein a surface of the coating layer is a surface for forming a thin layer of a data recording material thereon, a diameter of fine surface projections existing on a surface of the coating layer is in a range of 5 to 60 nm, a number of the fine surface projections is in a range of 3 million to 100 million/mm², and a number of adhered heavy metal foreign matter with a width of 15 µm or more is ½ m² or less (a polyester film for recording medium according to a second aspect).

8. The polyester film for recording medium, described above, wherein a polyester of the polyester film contains a titanium compound at a content of 2 to 6 ppm as a titanium atom equivalent relative to polyester, a content of an antimony compound is in a range of 0 to 2 ppm at an antimony atom equivalent relative to polyester, and a content of a germanium compound is in a range of 0 to 2 ppm at a germanium atom equivalent relative to polyester.

9. The polyester film for recording medium, described above, wherein the polyester further contains a phosphorus compound at a content of 0.2 to 9 ppm as a phosphorus atom equivalent relative to polyester, and a ratio of a content of said titanium compound to a content of said phosphorus compound is in a range of 0.7 to 10 at a weight ratio (Ti/P) of atom equivalents.

10. The polyester film for recording medium, described above, wherein a polyester of the polyester film is polyethylene terephthalate or polyethylene-2,6-naphthalate.

11. The polyester film for recording medium, described above, wherein the film is used for a magnetic tape of a digital recording system.

12. A magnetic recording tape wherein a ferromagnetic metal thin layer is provided on a surface of the coating layer of the above-described polyester film.

The above-described polyester film for recording medium according to the second aspect can be produced, for example, by the following process.

Namely, a process for producing the polyester film for recording medium according to the above-described items 7-11, by delivering a molten polyester from a slit of a die in a form of a sheet to form a sheet-like material, thereafter, forming a coating layer on a major one surface of a polyester film by applying and drying an aqueous coating solution containing a water soluble polymer or a water dispersible polymer and fine particles as its main constituents, and biaxially stretching the film, is characterized in that the polyester served to melting contains a titanium compound at a content of 2 to 6 ppm as a titanium atom equivalent relative to polyester and a phosphorus compound at a content of 0.2 to 9 ppm as a phosphorus atom equivalent relative to polyester, a content of an antimony compound is in a range of 0 to 2 ppm at an antimony atom equivalent relative to polyester, a content of a germanium compound is in a range of 0 to 2 ppm at a germanium atom equivalent relative to polyester, and a ratio of a content of the titanium compound to a content of the phosphorus compound is in a range of 0.7 to 10 at a weight ratio (Ti/P) of atom equivalents, a dust environment near the slit of the die is controlled at a class of 20,000 or less, and soils adhered to the vicinity of the slit are cleaned by suction at intervals of 4 to 12 hours.

Further, we provide the following polyester film for recording medium and magnetic recording tape.

13. A polyester film for recording medium with a lamination structure, having one major surface thereof laminated with a layer B containing fine particles with a mean particle diameter of 50 to 500 nm at a content of 0.01 to 1.0 wt %, wherein a surface A opposite to a surface laminated with the layer B of the film is a surface for forming a thin layer of a data recording material thereon, a surface roughness Ra of the surface A is in a range of 0.5 to 4 nm, and in a polyester forming the layer B, a titanium compound is contained at a content of 2 to 6 ppm as a titanium atom equivalent relative to polyester, a content of an antimony compound is in a range of 0 to 2 ppm at an antimony atom equivalent relative to polyester, and a content of a germanium compound is in a range of 0 to 2 ppm at a germanium atom equivalent relative to polyester (a polyester film for recording medium according to a third aspect).

14. The polyester film for recording medium, described above, wherein a phosphorus compound is further contained at a content of 0.2 to 9 ppm as a phosphorus atom equivalent relative to polyester in the polyester forming the layer B, and a ratio of a content of the titanium compound to a content of the phosphorus compound in the polyester is in a range of 0.7 to 10 at a weight ratio (Ti/P) of atom equivalents.

15. The polyester film for recording medium, described above, wherein, on a film surface of layer B side, a cover layer does not exist or a cover layer substantially not containing any particles exists.

16. The polyester film for recording medium, described above, wherein a polyester of the polyester film is polyethylene terephthalate or polyethylene-2,6-naphthalate.

17. The polyester film for recording medium, described above, wherein the film is used for a magnetic tape of a digital recording system.

18. A magnetic recording tape wherein a ferromagnetic metal thin layer is provided at a position outside of the surface A of the above-described polyester film.

DETAILED DESCRIPTION

The polyester may be a polyester which becomes a high-strength film by molecular orientation, but it is preferably polyethylene terephthalate or polyethylene-2,6-naphthalate. Namely, polyethylene terephthalate or polyethylene-2,6-naphthalate, 80% or more of the constitution component of which is ethylene terephthalate or ethylene naphthalate, is preferred. As polyester copolymerized components except ethylene terephthalate or ethylene naphthalate, for example, a diol component such as diethylene glycol, propylene glycol, neopentyl glycol, polyethylene glycol, p-xylilene glycol or 1,4-cyclohexane dimethanol, a dicarboxylic component such as adipic acid, sebacic acid, phthalic acid, isophthalic acid or 5-sodium sulfoisophthalic acid, a polyfunctional dicarboxylic component such as trimellitic acid or pyromellitic acid, p-oxyethoxy benzoic acid, etc. can be raised. Further, the above-described polyester may contain at least one of an alkali metal salt derivative of sulfonic acid which does not react with polyester, a polyalkylene glycol substantially insoluble to polyester, etc. at a content of not more than 5 wt %.

The polyester forming the polyester film for recording medium according to the first aspect contains a titanium compound substantially not having any particle diameter. "Substantially not having any particle diameter" means, not to have a solid particle-like shape such as titanium oxide, but to be dispersed finely and uniformly in polyester at a molecular condition, namely, not to exist in polyester as foreign matter or at a particle condition forming surface projections. It is preferred that such a titanium compound is contained in the polyester at a content of 2 to 6 ppm, preferably 3 to 5 ppm, as a titanium atom equivalent relative to polyester. Further, as other components, it is preferred that a phosphorus compound is contained at a content of 0.2 to 9 ppm as a phosphorus atom equivalent relative to polyester, a content of an antimony compound is in a range of 0 to 2 ppm at an antimony atom equivalent relative to polyester, a content of a germanium compound is in a range of 0 to 2 ppm at a germanium atom equivalent relative to polyester, and a ratio of a content of the titanium compound to a content of the phosphorus compound is in a range of 0.7 to 10, preferably 0.8 to 8, at a molar ratio (Ti/P) of titanium atom to phosphorus atom.

In order to realize a polyester film formed by such a polyester, it is preferred to prepare a polyester produced by using a titanium compound catalyst as a polymerization catalyst, as a raw material for producing the film.

In a case where the polyester is polymerized using a titanium compound catalyst, the amount of the metal in the polyester originating from the catalyst residual can be controlled within the above-described range, the foreign matters in the polyester attributed to precipitation of the catalyst residual in the polyester can be decreased, and therefore, such a condition is preferred. Although the titanium compound existing in the polyester as catalyst residual is a titanium compound substantially not having any particle diameter and generally the amount thereof is preferably as little as possible, because a certain amount or more of the catalyst is required in order to exhibit the catalyst effect due to the titanium compound catalyst, there is a limit for reducing the amount. Namely, if the amount is less than 2 ppm at a titanium atom equivalent, the time for polymerization of polyester becomes too long, the polyester is likely to deteriorate thermally and thermally deteriorated substances are likely to be generated in the polyester. On the contrary, if the amount of the titanium compound of the catalyst residual is more than 6 ppm at a titanium atom equivalent, foreign matters attributed to the catalyst in the polyester are liable to be precipitated and the foreign matters in the polyester are liable to increase.

Further, if the amount of the phosphorus compound in the polyester is less than 0.2 ppm at a phosphorus atom equivalent, when the polyester is polymerized, the polyester is likely to deteriorate thermally and thermally deteriorated substances are likely to be generated in the polyester. On the contrary, if the amount of the phosphorus compound is more than 9 ppm, phosphorus is liable to precipitate in the polyester and the foreign matters in the polyester are liable to increase. The rate of the titanium compound to the phosphorus compound in the polyester is preferably in a range of 0.7 to 10 at a molar ratio (Ti/P), and if the Ti/P is within this range, the thermal stability of the polyester becomes good, and when the polyester is formed to a film, particularly a thermal deterioration at the time of melt-extruding polyester chips can be prevented.

Although it is preferred that an antimony compound and a germanium compound substantially do not exist in the polyester (0 ppm), even if they exist, the content of each of them is controlled at 2 ppm or less at an atom equivalent relative to polyester. If the content of each of an antimony compound and a germanium compound is more than 2 ppm, they are liable to precipitate as antimony metal and germanium metal in a process for producing a polyester film, in particular, in an extrusion process, and because substances adhered to the surface of the polyester film increase, DO of a DVCAM tape produced from this film is likely to increase.

Further, on one surface A of the polyester film for recording medium according to the second aspect, a coating layer containing fine particles and organic compound is formed, and there exist fine surface projections due to the fine particles on the surface of the coating layer, the diameter thereof is in a range of 5 to 60 nm, the number thereof is in a range of 3 million to 100 million/mm$^2$, preferably, in a range of 5 million to 80 million/mm$^2$, and the number of heavy metal foreign matters adhered to the film surface, having a width of 15 μm or more, is ½ m$^2$ less, preferably 0.5/2 m$^2$ or less.

The fine surface projections on the surface of the coating layer can be formed by providing a coating layer containing fine particles in an organic compound on the polyester surface. The particle diameter of the fine particles is generally in a range of about 5 to about 50 nm. Further, as the kind of the particles, particles of an organic compound such as polyacrylic acid, polystyrene, polyethylene, polyester, polyacrylic ester, polymethyl methacrylate, polyepoxy resin, polyvinyl acetate, acryl-styrene copolymer, acrylic-system copolymer, various modified acrylic resins, styrene-butadiene copolymer and various modified styrene-butadiene copolymers, or particles prepared by covering inorganic particles such as silica, alumina or calcium carbonate forming cores with an organic polymer, can be used, but the kind of the particles is not limited to these particles. As the organic compound, a self-crosslinkage type compound, the end group of which is modified by epoxy, amine, carboxylic acid, hydroxyl group, etc., is preferred. Although inorganic particles such as silica or alumina can be used as the fine particles, organic particles are more preferred because the height of the projections easily becomes small relative to the diameter of the surface projections exhibited.

As the organic compound used for the coating layer, polar polymers such as polyvinyl alcohol, tragacanth gum, casein, gelatin, cellulose derivative, water soluble polyester, polyurethane, acrylic resin, acryl-polyester resin, isophthalic ester resin and methacrylic ester resin, and a blend of these polymers, can be used, but not limited thereto.

By the fine surface projections on the surface of the coating layer, the abrasion of the ferromagnetic metal thin layer formed on the surface of the coating layer by vacuum deposition, which is caused by a magnetic head at the time of recording/regenerating, is reduced. If the diameter of the fine surface projections is less than 5 nm, or if the number thereof is less than 3 million/mm$^2$, the surface of the magnetic layer of the magnetic tape is too flat, the ferromagnetic metal thin layer becomes too flat, the running durability of the magnetic tape against the magnetic head reduces, and therefore, such a condition is not suitable. If the diameter of the fine surface projections is more than 60 nm, or if the number thereof is more than 100 million/mm$^2$, the surface of the magnetic layer of the magnetic tape is too rough, dropouts of the magnetic tape are likely to increase, and therefore, such a condition is not suitable.

Further, Ra value of the surface of the coating layer is preferably in a range of 0.5 to 5 nm, more preferably in a range of 1.0 to 3.0 nm, in order to reduce the abrasion of the ferromagnetic metal thin layer formed thereon by vacuum deposition, caused by a magnetic head at the time of recording/regenerating, as little as possible, and to maintain the output property of the magnetic tape good. If the Ra value is less than 0.5 nm, the ferromagnetic metal thin layer formed on the surface of the coating layer by vacuum deposition is too flat, the ferromagnetic metal thin layer of the magnetic tape is liable to be abraded by a contact running with a magnetic head at the time of image recording/regenerating in a video camera, and therefore, such a condition is not preferable. If the Ra value is more than 5 nm, the surface of the ferromagnetic metal thin layer becomes too rough, the output property of the magnetic tape reduces, and therefore, such a condition is not preferable.

The diameter of the above-described fine surface projections can be controlled by adjusting the kind and the mean particle diameter of the fine particles in the coating layer, a transverse stretching temperature, etc. Further, the number of the fine surface projections and the Ra value of the surface roughness can be controlled by controlling the kind, the mean particle diameter and the solid component concentration of the above-described fine particles.

Further, in the polyester film, the number of heavy metal foreign matters with a width of 15 μm or more, which are adhered to the film surface, is ½ m$^2$ or less. If the number is more than the above-described range, dropouts of DVCAM magnetic tape increase.

In order to control the number of adhered heavy metal foreign matters in the above-described range, it is effective to reduce the amount of foreign matters attributed to a catalyst at the time of polymerization of polyester, and to achieve this, it is preferred that, in the polyester forming the film, a titanium compound is contained at a content of 2 to 6 ppm as a titanium atom equivalent relative to polyester, a content of an antimony compound is in a range of 0 to 2 ppm at an antimony atom equivalent relative to polyester, and a content of a germanium compound is in a range of 0 to 2 ppm at a germanium atom equivalent relative to polyester. Further, it is preferred that a phosphorus compound is contained at a content of 0.2 to 9 ppm as a phosphorus atom equivalent relative to polyester, and a ratio of a content of the titanium compound to a content of the phosphorus compound is in a range of 0.7 to 10 at a weight ratio (Ti/P) of atom equivalents.

Thus, in a case where the contents of antimony and germanium in the polyester is zero or very small and titanium and phosphorus are contained in respective specified ranges, because heavy metals such as antimony metal and germanium metal can be prevented from being precipitated from the polyester in a melt-extrusion process in the film production process, the number of adhered heavy metal foreign matters on the surface of the polyester film can be decreased.

This polyester is polymerized using a titanium compound catalyst as a polymerization catalyst, and it is preferred that the amount of titanium compound originating from the catalyst residual is in a range of 2 to 6 ppm at a titanium atom equivalent relative to polyester. Although generally the amount of titanium compound contained as the catalyst residual is preferably as little as possible, because a certain amount or more of catalyst is required in order to exhibit the catalyst effect due to the titanium compound catalyst, there is a limit for reducing the amount. Namely, if the content is less than 2 ppm at a titanium atom equivalent relative to polyester, the time for polymerization of polyester becomes too long, the polyester is likely to deteriorate thermally and thermally deteriorated substances are likely to be generated in the polyester. On the contrary, if the content of the titanium compound of the catalyst residual is more than 6 ppm at a titanium atom equivalent, foreign matters attributed to the catalyst in the polyester are liable to be precipitated and the foreign matters in the polyester are liable to increase.

Further, if the content of the phosphorus compound is less than 0.2 ppm at a phosphorus atom equivalent relative to polyester, when the polyester is polymerized, the polyester is likely to deteriorate thermally and thermally deteriorated substances are likely to be generated in the polyester, and therefore, such a condition is not preferable. On the contrary, if the content is more than 9 ppm at a phosphorus atom equivalent, phosphorus is liable to precipitate in the polyester and the foreign matters in the polyester are liable to increase, and therefore, such a condition is not preferable. It is preferred that the rate of the titanium compound to the phosphorus compound is preferably in a range of 0.7 to 10 at a weight ratio (Ti/P) of atom equivalents, in order to make the thermal stability of the polyester good, and to prevent thermal deterioration when the polyester is formed to a film, particularly, when polyester chips are melt-extruded.

Although it is preferred that an antimony compound and a germanium compound substantially do not exist in this polyester, even if they exist, the content of each of them is controlled at 2 ppm or less at an atom equivalent relative to polyester. If the content of an antimony compound and/or a germanium compound is more than 2 ppm at an atom equivalent, because antimony metal and germanium metal are liable to precipitate from the polyester in a process for producing a polyester film, in particular, in a melt extrusion process, the number of heavy metal foreign matters adhered to the surface of the polyester film increases, DO of a DVCAM tape produced from this film is likely to increase.

The Ra value of the surface B (a surface opposite to the above-described surface A of the coating layer side) of the polyester film is preferably in a range of 8 to 50 nm, more preferably in a range of 10 to 45 nm, in order to easily make a product with a good winding form when the polyester film is slit at a predetermined width after the polyester film is formed, and in order to suppress a undulation-like deformation of a ferromagnetic thin layer at minimum, which is caused by transfer of the roughness of the surface B to the opposite surface when the film is wound in a form of a roll after providing a ferromagnetic thin layer onto the surface of the coating layer on the major surface of the polyester film.

Although it is preferred that, on the surface B of the polyester film, a more rough cover layer containing a lubricant such as silicone is provided, a polyester film layer containing larger fine particles is laminated, or the above-described cover layer is further provided on this polyester film layer, the formation is not particularly restricted thereto. As fine particles used here, calcium carbonate, silica, alumina, polystyrene, etc. are exemplified. As these fine particles, particles having a mean particle diameter preferably in a range of 100 to 1,000 nm, more preferably in a range of 150 to 900 nm, are used, and the content thereof is preferably in a range of 0.05 to 1.0 wt %, more preferably in a range of 0.08 to 0.8 wt %.

The thickness of the polyester film is preferably less than 10 μm, more preferably in a range of 3.5 to 9.0 μm.

The polyester film for recording medium is produced by a film formation process wherein, after a molten polyester is delivered from a slit of a die in a form of a sheet to form a sheet-like material, a coating layer is formed on a major one surface of a polyester film by applying and drying an aqueous coating solution containing a water soluble polymer or a water dispersible polymer and fine particles as its main constituents, and thereafter, the film is biaxially stretched, and it is important to use a polyester, which contains a titanium compound at a content of 2 to 6 ppm as a titanium atom equivalent relative to polyester and a phosphorus compound at a content of 0.2 to 9 ppm as a phosphorus atom equivalent relative to polyester, and in which a content of an antimony compound is in a range of 0 to 2 ppm at an antimony atom equivalent relative to polyester, a content of a germanium compound is in a range of 0 to 2 ppm at a germanium atom equivalent relative to polyester, and a ratio of a content of the titanium compound to a content of the phosphorus compound is in a range of 0.7 to 10 at a weight ratio (Ti/P) of atom equivalents, as the polyester served to melt extrusion, and to control a dust environment near the slit of the die at a cleanliness class of 20,000 or less, and to clean by suction soils adhered to the vicinity of the slit at intervals of 4 to 12 hours, in order to reduce the adhered metal foreign matters sufficiently.

Further, the polyester film for recording medium according to the third aspect has a lamination structure in which the layer B containing fine particles is disposed on one surface, and for example, has a lamination structure such as A/B, A/C/B, etc.

When used as a base film for magnetic recording medium, a ferromagnetic metal thin layer is provided on a surface A opposite to the surface B by vacuum deposition. A known material can be used for the ferromagnetic metal thin layer, although it is not particularly restricted, a ferromagnetic material such as iron, cobalt, nickel or an alloy thereof is preferable. Generally, the thickness of the metal thin layer may be in a range of 100 to 300 nm.

The Ra value of the surface A of the polyester film is in a range of 0.5 to 4 nm, preferably in a range of 1 to 3 nm. If the Ra value is less than 0.5 nm, the ferromagnetic metal thin layer formed on the surface A by vacuum deposition is too flat, the ferromagnetic metal thin layer of a video tape is abraded by a video head at the time of recording/regenerating in a digital video tape recorder. If the Ra value is more than 4 nm, the surface of the ferromagnetic metal thin layer becomes too rough, the output property of the video tape reduces, and therefore, such a condition is not suitable for magnetic recording medium.

Surface projections due to the fine particles in the layer B are formed on the surface B of the layer B side of the polyester film, the mean particle diameter of the fine particles is in a range of 50 to 500 nm, and the content thereof in the layer B is in a range of 0.01 to 1.0 wt %. The Ra value of the layer B is in a range of 5 to 20 nm, preferably in a range of 7 to 15 nm, and the Rz value thereof is in a range of 100 to 400 nm, preferably in a range of 150 to 350 nm.

If the mean particle diameter of the fine particles is less than 50 nm or the content thereof is less than 0.01 wt %, it becomes too flat, and it is difficult to wind the film in a form of a roll, because wrinkles are generated too much when the polyester film is produced, particularly, when the film is slit to make a product by winding the slit film in a form of a roll in a slit process by a slitter after film formation. If the Rz value of the surface B is less than 100 nm, a similar tendency exists and therefore such a condition is not preferable. If the mean particle diameter of the fine particles is more than 500 nm or the content thereof is more than 1.0 wt %, after a magnetic metal layer is vacuum deposited onto the polyester film, when the film provided with the magnetic metal layer and wound in a form of a roll is left, the roughness of the surface B is transferred to the surface of the magnetic metal layer, the surface undulation of the magnetic metal layer becomes great, the electromagnetic conversion property of a digital video tape deteriorates, and dropouts thereof increase. Even if the Rz value of the surface B is more than 400 nm, a similar tendency exists and therefore such a condition is not preferable.

If the Ra value of the surface B is less than 5 nm, during the period in which a slit product with a length of 15,000 m or more is left after production of the polyester film, the shapes of the projections due to the fine particles on the surface B of the polyester film are transferred to the surface A particularly at a winding core portion near a bobbin, depression-like deformation is given to the surface A, and after vacuum deposition, the depression-like deformation is left on the ferromagnetic metal thin layer, the electromagnetic conversion property of a digital video tape deteriorates, dropouts increase, and therefore such a condition is not preferable. If the Ra value of the surface B is more than 20 nm, the roughness of the surface B increases, during the period in which a slit product with a length of 15,000 m or more is left after production of the polyester film, the roughness of the surface B is transferred to the surface A, the surface undulation of the surface A increases, and after vacuum deposition, the surface undulation of the ferromagnetic metal surface layer becomes great, the electromagnetic conversion property of a digital video tape deteriorates, dropouts increase, and therefore such a condition is not preferable.

As the fine particles to be contained in the layer B, for example, calcium carbonate, silica, alumina, polystyrene, alumina silicate, etc. can be used, but the particles are not limited thereto. A plurality of kinds of particles may be used as the fine particles. Further, a different component such as surfactant, antistatic agent, various ester components, etc. may be added.

In the polyester forming the layer B, a titanium compound is contained at a content of 2 to 6 ppm as a titanium atom equivalent relative to polyester, a content of an antimony compound is in a range of 0 to 2 ppm at an antimony atom equivalent relative to polyester, and a content of a germanium compound is in a range of 0 to 2 ppm at a germanium atom equivalent relative to polyester.

Although it is preferred that an antimony compound and a germanium compound substantially do not exist in this polyester, even if they exist, the content of each of them is controlled at 2 ppm or less at an atom equivalent relative to polyester. If the content of an antimony compound and/or a germanium compound is more than 2 ppm at an atom equivalent, the following problems may occur. Namely, when a magnetic metal is vacuum deposited on the polyester film at a high speed, the temperature of the base film elevates, from the film surface B, polyester decomposed substances containing the antimony compound and/or the germanium compound attributed to the polymer in the film are likely to be precipitated as foreign matters, and therefore, troubles are likely to occur such as a trouble that, after deposition, the foreign matters are transferred to the deposition surface side when wound, a trouble that a cooling can is soiled, and a trouble that soils are adhered to the vacuum deposited film and are transferred to the deposition surface side and they cause deterioration of the electromagnetic conversion property and increase of dropouts of the video tape. Further, accompanying with expiration of time after production, a low molecular material (an oligomer) of the polyester is liable to precipitate on the surface B as foreign matter together with the antimony compound and the germanium compound, the foreign matters are transferred to the surface A, and if the ferromagnetic thin layer is formed thereon by vacuum deposition, the electromagnetic conversion property of a produced digital video tape becomes bad, and in a digital video tape produced from a base film the lead time from the production to the vacuum deposition of which is three months or more, dropouts are likely to increase.

The polyester forming the layer B is polymerized using a titanium compound catalyst as a polymerization catalyst, and the amount of titanium compound originating from the catalyst residual is in a range of 2 to 6 ppm at a titanium atom equivalent relative to polyester. Further, it is preferred that a phosphorus compound is contained at a content of 0.2 to 9 ppm as a phosphorus atom equivalent relative to polyester, and a ratio of a content of the titanium compound to a content of the phosphorus compound is in a range of 0.7 to 10 at a weight ratio (Ti/P) of atom equivalents.

The polyester polymerized with the titanium compound catalyst is preferred as a polymer for the layer B, because foreign matters in the polyester generated by precipitation of the catalyst in the polyester decrease. Although generally the amount of titanium compound contained as the catalyst residual is preferably as little as possible, because a certain amount or more of catalyst is required in order to exhibit the catalyst effect due to the titanium compound catalyst, there is a limit for reducing the amount. Namely, if the content is less than 2 ppm at a titanium atom equivalent relative to polyester, the time for polymerization of polyester becomes too long, the polyester is likely to deteriorate thermally and thermally deteriorated substances are likely to be generated in the polyester, and the Ra value of the surface A is liable to exceed 4.0 nm. On the contrary, if the content of the titanium compound of the catalyst residual is more than 6 ppm at a titanium atom equivalent, foreign matters attributed to the catalyst in the polyester are liable to be precipitated and the foreign matters in the polyester are liable to increase, and also the Ra value of the surface A is liable to exceed 4.0 nm.

Further, it is preferred that a phosphorus compound is contained in this polyester at a content of 0.2 to 9 ppm as a phosphorus atom equivalent relative to polyester. If the content of the phosphorus compound is less than 0.2 ppm, when the polyester is polymerized, the polyester is likely to deteriorate thermally and polyester oligomer is likely to be generated in the thermally deteriorated polyester, and when the lead time after film formation to vacuum deposition becomes long, the polyester oligomer is likely to precipitate on the film surface B, and therefore, such a condition is not preferable. If the content of the phosphorus compound is more than 9 ppm, phosphorus is liable to precipitate in the polyester and the foreign matters in the polyester are liable to increase, the Ra value of the surface A is liable to exceed 4.0 nm, and therefore, such a condition is not preferable. It is preferred that the rate of the titanium compound to the phosphorus compound in the polyester is in a range of 0.7 to 10 at a weight ratio (Ti/P) of atom equivalents. If the Ti/P is within this range, the thermal stability of the polyester becomes good, thermal deterioration when the polyester is formed to a film, particularly, when polyester chips are melt-extruded, can be prevented, and increase of oligomer in the polyester film can be suppressed, and therefore, such a condition is preferable.

In the film, polyester forming a layer other than the layer B may be the above-described polyester for the layer B, and another polyester may be used.

The above-described polyester in the polyester film for recording medium according to the first and second aspects, and the polyester for the layer B in the polyester film for recording medium according to the third aspect, can be produced by the following process using a titanium compound catalyst. Although the explanation will be carried out with respect to a case of polyethylene terephthalate as a concrete example, the process is not limited thereto.

Polyethylene terephthalate is generally produced by any of the following polymerization processes. Namely, (1) a process wherein terephthalic acid and ethylene glycol are prepared as raw materials, a low polymerized material is obtained by a direct esterification, and thereafter, a high molecular polymer is obtained by a condensation polymerization, and (2) a process wherein dimethyl terephthalate and ethylene glycol are prepared as raw materials, a low polymerized material is obtained by a trans-esterification, and thereafter, a high molecular polymer is obtained by a condensation polymerization. Although the esterification can be processed even with no catalyst, a catalyst may be added. Further, in the trans-esterification, a catalyst is added and the reaction is proceeded, and after the trans-esterification is substantially completed, a phosphorous compound is added for the purpose of deactivating the catalyst used for the reaction. The above-described reaction may be carried out at any system of batch system, semi-batch system and continuous system.

A titanium compound catalyst is added as a polymerization catalyst to a low polymerized material obtained at an arbitrary stage in a series of reaction of the above-described (1) or (2), preferably at a stage in the first half of a series of reaction of the above-described (1) or (2), after various additives are added as needed, and the condensation polymerization is carried out to obtain a high-molecular polyethylene terephthalate.

Although the titanium compound and the phosphorus compound to be added in the polymerization process of the polyester may be added into the polyester reaction system as they are, it is preferred that a solution or a slurry prepared by adding a diol-group solvent to them beforehand is added to the reaction system, because generation of foreign matter in the polymer can be more suppressed. The solution or the slurry can be prepared by mixing the titanium compound catalyst or the phosphorus compound with a solvent containing a polyester forming diol component such as ethylene glycol or propylene glycol to make a solution or a slurry, and thereafter, as needed, removing a low-boiling point component such as an alcohol used at the time of synthesis of the titanium compound catalyst or the phosphorus compound. In a case where the titanium compound catalyst etc. are added as catalysts for esterification or trans-esterification, the timing of the addition may be immediately after addition of raw materials, or may be together with addition of raw materials. Further, in a case where they are added as catalysts for condensation polymerization, the timing of the addition may be substantially before start of the reaction of the condensation polymerization, and they may be added before the esterification or the trans-esterification, or after their reactions, or before start of the reaction of the condensation polymerization. In this case, as the method for suppressing deactivation of the catalyst due to the contact of the titanium compound with the phosphorus compound, there are a method for adding them to different reaction baths, in a case where the titanium compound and the phosphorus compound are added to the same bath, a method for shifting the adding timings by 1 to 15 minutes and a method for separating positions for addition from each other.

Further, a compound prepared by reacting the titanium compound catalyst with the phosphorus compound beforehand can also be used as a catalyst. In this case, the following reaction methods may be employed.

(1) The phosphorus compound at a form of raw solution or a form of a solution prepared by being dissolved and diluted in a solvent is dropped in and reacted with a solution prepared by mixing the titanium compound catalyst with a solvent and dissolving a part or the entire of the compound in the solvent.

(2) In a case where a ligand of the titanium compound such as hydroxycarboxylic-group compound or polycarboxylic-group compound is used, the ligand compound or the titanium compound at a form of raw solution or a form of a solution prepared by being dissolved and diluted in a solvent is dropped in a solution prepared by mixing the titanium compound or the ligand compound with a solvent and dissolving a part or the entire of the compound in the solvent. Further, the phosphorus compound at a form of raw solution or a form of a solution prepared by being dissolved and diluted in a solvent is dropped in and reacted with this mixture solution. This reaction method is more preferable from the viewpoints of thermal stability and improvement of color tone.

As the condition of the above-described reaction, heating at a temperature of 0 to 200° C. for 1 minute or more, preferably at a temperature of 20 to 100° C. for 2 to 100 minutes, is employed. The reaction pressure at that time is not particularly restricted, and a normal pressure may be employed. Further, the solvent used here may be selected from solvents capable of dissolving a part or the entire of the titanium compound, the phosphorus compound and a compound containing a carbonyl group, and preferably it is selected from water, methanol, ethanol, ethylene glycol, propane diol, butane diol, benzene and xylene.

As the titanium compound of polymerization catalyst used when the polyester is produced, titanium compound group (including titanium oxides) containing functional groups represented by the following chemical formulae as substituents can be raised.

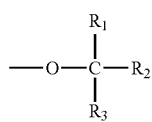

Formula 1

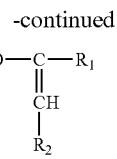

Formula 2

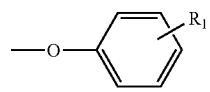

Formula 3

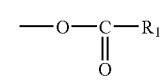

Formula 4

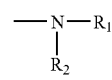

Formula 5

Formula 6

In the above-described formulae 1 to 6, R1 to R3 represent independently, respectively, hydrogen, a hydrocarbon group having a carbon number of 1 to 30, an alkoxy group, a hydroxyl group, a carbonyl group, an acetyl group, a carboxylic group or an ester group, or a hydrocarbon group containing an amino group and having a carbon number of 1 to 30.

As the functional group of the above-described formula 1, an alkoxy group such as ethoxide, propoxide, isopropoxide, butoxide, 2-ethylhexoxide, etc., and a hydroxy polyfunctional carboxylic acid-group compound such as lactic acid, malic acid, tartaric acid, citric acid, etc., can be raised. Further, as the functional group of the above-described formula 2, a β-diketone-group compound such as acetylacetone, and a ketone ester-group compound such as methyl acetoacetate, ethyl acetoacetate, etc., can be raised. Further, as the functional group of the above-described formula 3, a functional group such as phenoxy, crecylate, salicylic acid, etc., can be raised.

Further, as the functional group of the above-described formula 4, can be raised a polyfunctional carboxylic acid-group compound such as an acrylate such as lactate, stearate, etc., phthalic acid, trimellitic acid, trimesic acid, hemimellitic acid, pyromellitic acid, oxalic acid, malonic acid, succinic acid, glutaric acid, adipic acid, sebacic acid, maleic acid, fumaric acid, cyclohexane dicarboxylic acid, and anhydride thereof, etc., and a polyfunctional carboxylic acid containing nitrogen such as ethylene diamine tetraacetic acid, nitrilotripropionic acid, carboxy iminodiacetic acid, carboxy methyliminodipropionic acid, dirthylene triaminopentaacetic acid, triethylene tetraminohexaacetic acid, iminodiacetic acid, iminodipropionic acid, hydroxyethyliminodiacetic acid, hydroxyethyliminodipropionic acid, methoxyethyliminodiacetic acid, etc. Further, as the functional group of the above-described formula 5, a functional group such as aniline, phenylamine, diphenylamine, etc., can be raised.

Among these, a titanium compound catalyst containing the functional group of formula 1 and/or the functional group of formula 4 is preferable from the viewpoint of thermal stability and color tone of polymer.

As a concrete catalyst of titanium compound group, titanium diisopropoxybisacetylacetonate, titanium triethanolaminateisopropoxide, etc. containing two or more kinds of substituents of these formulae 1 to 6, can be raised. Further, as the catalyst of titanium oxide compound group, a composite oxide the main metals of which comprise titanium and silicon, or a ultra-fine particles of titanium oxide, can be raised.

These titanium compound catalysts exhibit catalyst function substantially contributing to accelerate the following reactions (1) to (3) (the entire or a part of elementary reactions) in the polymerization process which produces the polyester synthesized from dicarboxylic acid or its ester forming derivative and diol or its ester forming derivative.

(1) Esterification which is a reaction of dicarboxylic acid component and diol component.

(2) Trans-esterification which is a reaction of ester forming derivative component of dicarboxylic acid and diol component.

(3) Condensation polymerization which, after esterification or trans-esterification substantially finishes, highly polymerizes the obtained polyethylene terephthalate low polymerized material by dediol reaction.

Further, in order to contain the phosphorus compound in the polyester at a predetermined content, the phosphorus compound may be added in the polyester production process. As this phosphorus compound, any compound of phosphoric acid group, phosphorus acid group, phosphonic acid group, phosphinic acid group, phosphine oxide group, phosphonous acid group, phosphinous acid group and phosphine group may be employed, and one or two kinds thereof may be used. The compound of phosphoric acid group and/or phosphonic acid group is preferred, in particular, from the viewpoint of thermal stability and color tone of polyester.

Further, for the purpose of improving the color tone of the obtained polymer and the thermal resistance of the polymer, an alkali metal compound, an alkaline earth metal, an aluminum compound, a zinc compound, a tin compound, a magnesium compound, a manganese compound, a cobalt compound, etc. may be added.

In the polyester film for recording medium according to the first aspect, the number of surface defects with a height of 120 nm or greater attributed to foreign matter contained in the film, which exist on the surface A of the coating layer, is 30/100 $cm^2$ or less. If the surface defects with the above-described height exist more than a number of the above-described range, because dropouts (DO) of a magnetic tape for DVC, particularly, DO of a tape for DVCAM, increase, such a condition is not suitable.

In order to further increase the running durability of a magnetic layer of a magnetic tape for DVC or DVCAM against a magnetic head, it is preferred that fine particles with a mean particle diameter of 40 to 70 nm are contained in a layer of polyester film at the side formed with the coating layer at a content of 0.01 to 0.10 wt %. If the mean particle diameter of the fine particles is less than 40 nm, the projection on the magnetic layer become too small and the improvement of the running durability of the magnetic layer cannot be expected. If the mean particle diameter is more than 70 nm, the surface roughness of the magnetic layer becomes too great and the output of the magnetic tape reduces, and therefore, such a condition is not preferable. If the content is less than 0.01 wt %, the number of the projections on the magnetic layer due to the fine particles becomes small, and the improvement of the running durability of the magnetic layer cannot be expected. If the content is more than 0.10 wt %, the surface roughness of the magnetic layer becomes too great and the output of the magnetic tape reduces, and therefore, such a condition is not preferable. Further, by the presence of the fine particles, chipped substances of the magnetic layer adhered to a magnetic head of a DVCAM video tape recorder is cleaned at the time of running of the magnetic tape, the cleaning of the magnetic head is automatically carried out, generation of dropouts attributed to clogging of the chipped substances of the magnetic layer to the magnetic head can be suppressed. If the mean particle diameter thereof is less than 40 nm, the cleaning effect is not exhibited, and such a condition is not preferable. If the mean particle diameter thereof is more than 70 nm, the surface roughness of the magnetic layer becomes too great and the output of the magnetic tape reduces, and therefore, such a condition is not preferable. As the fine particles, silica, calcium carbonate, alumina, polyacrylic acid sphere, polystyrene sphere, etc. can be used, but not limited thereto.

The Ra value of the surface B (a surface opposite to the surface A of the coating layer side described above) of the polyester film is preferably in a range of 5 to 35 nm, more preferably in a range of 6 to 25 nm, in order to make a product with a good winding form when the polyester film is slit at a predetermined width after the polyester film is formed, and in order to suppress the undulation-like deformation of the ferromagnetic thin layer caused by the transfer of the roughness of the surface B to the side of the surface A by winding of a roll after the ferromagnetic thin layer is provided on the surface A of the polyester film, as little as possible. The Rz value of the surface B is preferably in a range of 100 to 500 nm, more preferably in a range of 140 to 350 nm, in order to maintain the winding form of the roll product after forming and slitting of the polyester film, and in order to suppress the undulation-like deformation of the ferromagnetic thin layer caused by the transfer of the roughness of the surface B to the side of the surface A by winding of a roll after the ferromagnetic thin layer is provided on the surface A of the polyester film, as little as possible.

Although it is preferred that, on the surface B of the polyester film, a more rough cover layer containing a lubricant such as silicone is provided, a polyester film layer containing larger fine particles is laminated, or the above-described cover layer is further provided on this polyester film layer, the formation is not particularly restricted thereto. As fine particles used here, calcium carbonate, silica, alumina, polystyrene, etc. are exemplified. As these fine particles, particles having a mean particle diameter preferably in a range of 100 to 1,000 nm, more preferably in a range of 150 to 900 nm, are used, and the content thereof is preferably in a range of 0.05 to 1.0 wt %, more preferably in a range of 0.08 to 0.8 wt %.

The thickness of the polyester fun is preferably 10 μm or less, more preferably in a range of 3.5 to 9.0 μm.

Although a ferromagnetic metal thin layer is provided on the surface A in order to use the polyester film for magnetic recording medium, further, preferably a backcoat layer, which is formed by coating a solution comprising solid fine particles and a binder and added with various additives as needed, is provided on the surface B, and known materials can be used for the solid fine particles, the binder and the additives, and they are not particularly restricted. The thickness of the backcoat layer is preferably in a range of about 0.3 to about 1.5 μm.

Further, in the aforementioned process for producing the polyester film for recording medium according to the second aspect, because a specified polyester, in which the content of antimony compound and the content of germanium compound are extremely small to be both in a range of 0 to 2 ppm, is used for producing the film, foreign matters in the polyester generated by precipitation of catalyst in the polyester can be reduced, and the amount of heavy metal foreign matters adhered to the film surface can be reduced. Even at such a condition, because it is difficult to completely extinguish the adhered heavy metal foreign matters, means for controlling the dust environment near a slit of a die at a cleanliness class of 20,000 or less, and means for suction cleaning the soils adhered to the portion near the silt at intervals of 4 to 12 hours, are employed together. In order to control the dust environment near the slit of the die at a cleanliness class of 20,000 or less, for example, means for supplying air, taken through a middle class filter, to the vicinity of the slit of the die may be employed. Further, the suction cleaning of the adhered soils can be carried out, for example, by a vacuum cleaner.

By using such means together, it becomes possible to reduce the number of the adhered heavy metal foreign matters with a width of 15 μm or more down to a level of ½ m² or less, and as a result, the dropouts of DVCAM tape produced using this film as a base film can be reduced to a level sufficient for practical use.

Further, in the polyester film for recording medium according to the third aspect, although a cover layer may not be provided to the surface of the layer B side of the polyester film, in a case where the cover layer is provided, it is preferred that a cover layer substantially not having any particle is provided. This cover layer contributes to reduce occurrence of a trouble that, when the magnetic metal is vacuum deposited on the polyester film at a high speed, the temperature of the base film elevates, decomposed substances are precipitated from the polymer in the film to the film surface B, at the time of winding after deposition, the decomposed substances are transferred to the deposition surface side or soil a cooling can, and soils adhere to the deposited film, the adhered substances are transferred to the deposition surface side, and deterioration of the electromagnetic conversion property and increase of dropouts of a video tape occur. The thickness of the cover layer is preferably in a range of 0.3 to 10 nm. If the thickness is less than 0.3 nm, the effect for preventing the precipitation of the decomposed substances of the polyester film through the cover layer becomes small. If the thickness is more than 10 nm, the cover layer is liable to be chipped by a cooling can, and the cooling can is likely to soil, and therefore such a condition is not preferable.

It is preferred that the cover layer has a good slipping property relative to a cooling can and it is hard to be chipped, and it has a function which does not permeate decomposed substances from the polyester film, it is formed mainly from a water soluble polymer and/or a water dispersible polymer, preferably formed from a composition prepared by adding a silicone and a silane coupling agent to the water soluble polymer and/or the water dispersible polymer.

Further, it is preferred that fine particles substantially do not exist in the cover layer in order to make this cover layer hard to be chipped. Namely, although there hardly occurs a problem of chipping in a film formation process even if fine particles with a particle diameter of about three times the thickness of the cover layer are contained in the cover layer at a weight ratio in the cover layer of about 20%, because the particles are liable to be chipped by a cooling can and to be fallen at the time of deposition, and because various conveying rollers in a magnetic tape processing process are liable to be chipped, fine particles substantially are not present in the cover layer provided on the layer B side.

As the water soluble polymer used for the cover layer, polyvinyl alcohol, tragacanth gum, gum arabic, casein, cellulose derivative such as methylcellulose, hydroxyethylcellulose or carboxylmethylcellulose, polyesterether copolymer, water soluble polyester copolymer, etc. can be used. Further, as an emulsion of the water dispersible polymer, polymethyl methacrylate emulsion, polyacrylic ester emulsion, etc. can be used.

Among these, polymer blend material of cellulose derivative and water soluble polyester copolymer is preferable. As the water soluble polyester copolymer, a copolymer, which is a polyester prepared by condensation polymerization of dicarboxylic acid component and glycol component, and to which a water soluble property is given, for example, by copolymerization of a functional acid component such as dicarboxylic acid component containing sulfonic acid group at a content of 5 or more mol % relative to total carboxylic acid component, and/or, copolymerization of polyalkyleneether glycol component as the glycol component at a content of 2 to 70 wt %, is preferred, but not limited thereto. As the dicarboxylic acid component containing sulfonic acid group, 5-sulfoisophthalic acid, 2-sulfoterephthalic acid, metal salt thereof, phosphonium salt, etc. can be preferably used, and 5-sodium sulfoisophthalic acid is particularly preferred. As the other dicarboxylic acid component at the time of copolymerization of 5-sodium sulfoisophthalic acid, isophthalic acid, terephthalic acid, etc. are preferred, and as the glycol component, ethylene glycol, diethylene glycol, etc. are preferred. The cellulose derivative contributes to prevent precipitation of polyester decomposed substances, and the water soluble polyester copolymer contributes to increase the adhesive property between the cellulose derivative and the surface of the polyester film.

As the silicone, a polymer, in which many organic silicon compounds each having a siloxane coupling in its molecular structure, such as polydimethylsiloxane, are linked at covalent bond, can be used. By the silicone, the slipping property of the cover layer can be improved, and the running property and the chipping resistance against a cooling can be ensured. Further, blocking between film layers when the polyester film is wound can be prevented. A fluorine compound may be used as a slipping agent.

As the silane coupling agent, an organic silicon monomer having two or more different reaction groups in its molecule can be raised, one of the reaction groups is methoxy group, ethoxy group, silanol group, etc., and the other reaction group is vinyl group, epoxy group, methacrylic group, amino group, mercapto group, etc. As the reaction group, a group binding with the side chain or end group of the water soluble polymer and with polyester is selected, and as the silane coupling agent, vinyltrichlorosilane, vinyltriethoxysilane, vinyltris(β-methoxyethoxy)silane, γ-glycidoxypropyltrimethoxysilane, γ-methacryloxypropyltrimethoxysilane, N-β(aminoethyl)γ-aminopropylmethyldimethoxysilane, γ-mercaptopropyltrimethoxysilane, γ-aminopropyltriethoxysilane, etc. can be employed. The silane coupling agent contributes to prevent silicone from becoming free from the slipping agent layer, and also contributes to improve the adhesive property between the cover layer and polyester.

In the lamination structure of the film, the thickness of the layer B is preferably in a range of 8 to 25% relative to the total thickness, more preferably in a range of 10 to 20%. If the thickness of the layer B is less than 8% relative to the total thickness, fine particles in the layer B are likely to be fallen, and therefore, such a condition is not preferable. If the thickness of the layer B is more than 25% relative to the total thickness, the shape of the fine particles in the layer B is liable to generate a projection-like deformation on the surface A through other layers, and therefore, such a condition is not preferable.

Next, an example of a process for producing the polyester film and the magnetic recording tape will be explained.

For the polyester film according to the aforementioned first aspect, a polyester is used as the polymer for the film raw material, which is polymerized using a titanium compound catalyst, and in which a titanium compound is contained at a content of 2 to 6 ppm as a titanium atom equivalent relative to polyester and a phosphorus compound is contained at a content of 0.2 to 9 ppm as a phosphorus atom equivalent relative to polyester, a content of an antimony compound is in a range of 0 to 2 ppm at an antimony atom equivalent relative to polyester, a content of a germanium compound is in a range of 0 to 2 ppm at a germanium atom equivalent relative to polyester, and a ratio of a content of the titanium compound to a content of the phosphorus compound is in a range of 0.7 to 10 at a molar ratio (Ti/P) of titanium atom to phosphorus atom. Using this polyester at a condition removing contained particles as much as possible, a film is produced in a usual plastic film production process comprising melting, forming, biaxial stretching and heat setting steps, and in the stretching process, the film is stretched at a temperature of 90 to 140° C. and at draw ratios in the longitudinal and transverse directions of 2.7 to 5.5 times and 3.5 to 7.0 times, and heat set at a temperature of 190 to 220° C. A predetermined coating layer can be formed on one surface of the film by performing the following operation.

The coating layer is formed on the surface A side of the flat polyester film after uniaxially stretching by applying a coating solution comprising an organic compound containing fine particles with a mean particle diameter of 5 to 60 nm, preferably 7 to 50 nm, at a content of 0.5 to 12.0 wt %, preferably 0.6 to 10.0 wt %, and fine surface projections are formed on the surface A. As the organic compound used for the coating layer, polar polymers such as polyvinyl alcohol, tragacanth gum, casein, gelatin, cellulose derivative, water soluble polyester, polyurethane, etc., and a blend of these polymers, can be used, but not limited thereto. The number of the fine surface projections can be controlled by controlling the kind and mean particle diameter of the fine particles and the concentration of the solid component in the application.

Further, it is effective to use the aforementioned specified polyester as the polymer for the raw material of the film and to control the atom equivalents of phosphorus, antimony and germanium within the respective preferable ranges, in order to suppress surface defects with a height of 120 nm or more attributed to foreign matter in the film at 30/100 cm$^2$ or less.

The film formation may be carried out by using a coextrusion technology at the time of melt extrusion of the film, preparing the above-mentioned polyester removing contained particles as much as possible as the raw material for the layer A, preparing a polyester positively containing greater particles as the raw material for the layer B and melt extruding a laminated film of A/B lamination structure, and may be carried out without using a layer B by applying a coating solution containing slipping agent onto the surface B side opposite to the above-described surface A side and performing the slipping treatment to the surface B side. It may be carried out to use a layer B, to further apply the coating solution, containing slipping agent and to perform the slipping treatment of the surface B side.

Although the biaxial stretching can be carried out, for example, by a sequential biaxially stretching or a simultaneous biaxially stretching, if desired, a stretching for a so-called tensilized type can be employed wherein the mechanical strength is increased by re-stretching the film in the longitudinal or transverse direction or both directions before heat setting.

The polyester film is suitable as a base film for magnetic recording medium, particularly for use of DVCAM video tape and data storage tape because of obtaining an excellent result. Further, it is suitably used as a base film of an optical recording tape in which an image data recording alloy layer comprising photosensitive Ge, Sb, Te, etc. is formed and which can record image data, etc.

The magnetic recording tape is produced by providing a ferromagnetic metal thin layer on the surface A of the coating layer of the polyester film by vacuum deposition, and then forming a tape, and as the metal thin layer to be used, a known metal thin layer can be employed, and although the layer is not particularly limited, a ferromagnetic material comprising iron, cobalt, nickel or an alloy thereof is preferred. The thickness of the metal thin layer is preferably in a range of 20 to 300 nm.

Namely, the magnetic recording tape can be produced by forming the ferromagnetic metal thin layer comprising Co, etc. on the surface A of the polyester film by vacuum deposition at a thickness of about 20 to about 300 nm, coating a diamond-like carbon layer with a thickness of about 10 nm on this metal thin layer, further applying a lubricant thereon, on the other hand, providing a backcoat layer on the surface B by applying a solution comprising solid fine particles and binder and added with various additives as needed, and then, cutting the film at a predetermined tape width.

For the polyester film according to the aforementioned second aspect, a polyester is used as the polymer for the film raw material, which is prepared by removing contained particles as much as possible, and in which a titanium compound originating from catalyst residual is contained at a content of 2 to 6 ppm as a titanium atom equivalent relative to polyester and a phosphorus compound is contained at a content of 0.2 to 9 ppm as a phosphorus atom equivalent relative to polyester, a content of an antimony compound is in a range of 0 to 2 ppm at an antimony atom equivalent relative to polyester, a content of a germanium compound is in a range of 0 to 2 ppm at a germanium atom equivalent relative to polyester, and a ratio of a content of the titanium compound to a content of the phosphorus compound is in a range of 0.7 to 10 at a weight ratio (Ti/P) of atom equivalents. Using this polyester as the raw material, a film is produced in a usual plastic film production process comprising melting, forming, biaxial stretching and heat setting steps, and in the stretching process, the film is stretched at a temperature of 90 to 140° C. and at draw ratios in the longitudinal and transverse directions of 2.7 to 5.5 times and 3.5 to 7.0 times, and heat set at a temperature of 190 to 220° C. Then, the dust environment near a slit of a die is controlled at a class of 20,000 or less, and soils adhered to the vicinity of the slit are cleaned by suction at intervals of 4 to 12 hours. Further, a coating layer is formed on one surface of the film by performing the following operation.

On one surface of the flat polyester film after longitudinal stretching, an aqueous coating solution containing a water soluble polymer or a water dispersible polymer and fine particles with a mean particle diameter of 5 to 50 nm as its main constituents is applied so that the solid component application concentration becomes in a range of 3 to 100 mg/m$^2$. As the water soluble polymer or the water dispersible polymer, polar polymers such as polyvinyl alcohol, tragacanth gum, casein, gelatin, cellulose derivative, water soluble polyester, water soluble polyesterether copolymer, polyurethane, isophthalic ester resin, methacrylic ester resin, etc. and a blend of these polymers, can be used, but not limited thereto.

The content of the fine particles in this aqueous coating solution is preferably in a range of 0.5 to 12.0 wt %, more preferably in a range of 0.6 to 10.0 wt %. Further, the solid component application concentration of the aqueous coating solution is preferably in a range of 3 to 100 mg/m$^2$. If the solid component application concentration is less than 3 mg/m$^2$, the number of surface projections is liable to become less than 3 million/mm$^2$, and the Ra value of the surface roughness is liable to become less than 0.5 nm. If the solid component application concentration is more than 100 mg/m$^2$, the number of surface projections is liable to become more than 100 million/mm$^2$, and the Ra value of the surface roughness is liable to become more than 5.0 nm.

The film formation may be carried out by using a coextrusion technology, preparing the above-mentioned polyester removing contained particles as much as possible as the raw material for the layer A, preparing a polyester positively containing greater particles as the raw material for the layer B and melt extruding a laminated film of A/B lamination structure, and may be carried out without using a layer B by applying a coating solution containing slipping agent onto the surface B side opposite to the above-described surface A side and performing the slipping treatment to the surface B side. It may be carried out to use a layer B, to further apply the coating solution containing slipping agent and to perform the slipping treatment of the surface B side.

Although the biaxial stretching can be carried out, for example, by a sequential biaxially stretching or a simultaneous biaxially stretching, if desired, a stretching for a so-called tensilized type can be employed wherein the mechanical strength is increased by re-stretching the film in the longitudinal or transverse direction or both directions before heat setting.

The polyester film is suitable as a base film for magnetic recording medium, particularly for use of DVCAM video tape because of obtaining an excellent result. Further, it is suitably used as a base film of an optical recording tape in which an image data recording alloy layer comprising photosensitive Ge, Sb, Te, etc. is formed and which can record image data, etc.

Also in the magnetic recording tape produced by using the polyester film according to the second aspect as its base film, a ferromagnetic metal thin layer is provided on the surface A of the coating layer of the polyester film according to the present invention by vacuum deposition, and then a tape is formed, and as the metal thin layer to be used, a known metal thin layer can be employed, and although the layer is not particularly limited, a ferromagnetic material comprising iron, cobalt, nickel or an alloy thereof is preferred.

Namely, the magnetic recording tape can be produced by forming the ferromagnetic metal thin layer comprising Co, etc. on the surface A of the coating layer of the polyester film by vacuum deposition at a thickness of about 20 to about 300 nm, coating a diamond-like carbon layer with a thickness of about 10 nm on this metal thin layer, further applying a lubricant thereon, on the other hand, providing a backcoat layer on the surface B by applying a solution comprising solid fine particles and binder and added with various additives as needed, and then, cutting the film at a predetermined tape width. Known materials can be used for the solid fine particles, the binder and the additives, and they are not particularly restricted. The thickness of the backcoat layer is preferably in a range of about 0.3 to about 1.5 μm.

The polyester film according to the aforementioned third aspect can be produced by a usual plastic film production process comprising melting, forming, biaxial stretching and heat setting steps, and at that time, a polyester is used as the polyester for the layer B, which is polymerized by using a titanium compound, and in which a titanium compound originating from catalyst residual is contained at a content of 2 to 6 ppm as a titanium atom equivalent relative to polyester and a phosphorus compound is contained at a content of 0.2 to 9 ppm as a phosphorus atom equivalent relative to polyester, a content of an antimony compound is in a range of 0 to 2 ppm at an antimony atom equivalent relative to polyester, a content of a germanium compound is in a range of 0 to 2 ppm at a germanium atom equivalent relative to polyester, and a ratio of a content of the titanium compound to a content of the phosphorus compound is in a range of 0.7 to 10 at a weight ratio (Ti/P) of atom equivalents. The film can be produced by containing fine particles with a mean particle diameter of 50 to 500 nm in this polyester at a content of 0.01 to 1.0 wt %, by extruding a sheet at a lamination structure of A/B, etc. using a coextrusion technology, and as needed, by forming a cover layer on the surface of the layer A side or the layer B side by coating. A lamination structure having more layers may be employed, and the production process is not limited the above-described process.

In a case of a film having a lamination structure of A/B, the film can be produced by melt extruding by coextrusion of a raw material for the layer A removing contained particles as much as possible and a raw material for the layer B containing fine particles with a mean particle diameter of 50 to 500 nm at a content of 0.01 to 1.0 wt % (the above-described polyester is used), forming a non-stretched film sheet by cooling and solidifying on a casting drum, uniaxially stretching the film, applying a coating solution for forming a cover layer on the film surface and drying as needed, thereafter, stretching and orienting the film in a direction perpendicular to the direction for the above-described uniaxial stretching, and heat setting the film.

As the coating solution to be applied on the surface of the layer A side, a coating solution, prepared by adding fine particles with a mean particle diameter of 5 to 50 nm to an aqueous solution dissolved or dispersed with water soluble polymer and/or water dispersible polymer at a predetermined content, can be used.

As the coating solution to be applied on the surface of the layer B side, an aqueous solution, prepared by adding silicone and silane coupling agent to the above-described water soluble polymer and/or water dispersible polymer, can be used. As the water soluble polymer, as aforementioned, a blend material of cellulose derivative [A] and water soluble polyester copolymer [B] is particularly preferable. The weight ratio of [A]/[B]/silicone/silane coupling agent is preferably 100/2-200/0.1-50/1-40.

Where, fine particles may be contained in the layer A in order to further increase the durability of the magnetic tape against a magnetic head.

Although the biaxial stretching can be carried out, for example, by a sequential biaxially stretching or a simultaneous biaxially stretching, if desired, a stretching for a so-called tensilized type can be employed wherein the mechanical strength is increased by re-stretching the film in the longitudinal or transverse direction or both directions before heat setting.

In order to form a cover layer on the layer A, as aforementioned, a coating solution with predetermined composition and concentration may be applied onto a base-layer film at a stage after finishing a uniaxial stretching. As the application method, any of doctor blade method, gravure method, reverse roll method and metering bar method may be employed. The Ra of the surface A can be controlled by controlling the kind and component of the fine particles in the cover layer and the fine particles in the layer A. A similar method may be employed also for forming the cover layer on the layer B, and the thickness of the cover layer can be controlled by controlling the solid component concentration of the coating solution and the thickness of the coating solution.

The polyester film according to the third aspect is suitable as a base film for magnetic recording medium, particularly for use of digital video tape because of obtaining an excellent result. Further, it is suitable also for data storage tape because of obtaining an excellent result. Further, it can also be suitably used as a base film of an optical recording tape in which an image data recording alloy layer comprising photosensitive Ge, Sb, Te, etc. is formed and which can record image data, etc.

The magnetic recording tape formed by using the polyester film according to the third aspect as its base film can also be produced by forming the ferromagnetic metal thin layer comprising Co, etc. on the surface A of the polyester film by vacuum deposition at a thickness of 50 to 300 nm, coating a diamond-like carbon layer with, a thickness of about 10 nm on this metal thin layer, further applying a lubricant thereon at a thickness of about 5 nm, on the other hand, providing a backcoat layer on the cover layer formed on the surface B at a thickness of about 0.3 to about 1.5 μm by applying a solution comprising solid fine particles and binder and added with various additives as needed, and then, cutting the film at a predetermined tape width.

EXAMPLES

Hereinafter, the determination methods used in the examples will be shown.

(1) Particle Diameter of Fine Particles:

Powder of fine particles is dispersed on an examination table of an electron microscope so that the particles are overlapped as little as possible, and observed by the electron microscope (preferably, a transmission electron microscope) at a magnification of about 1,000,000 times, and areal circle equivalent diameters are determined as to at least 100 particles, and number average value thereof is defined as the particle diameter.

In a case where the particle diameter is determined from a film, it is determined by the following method (a), etc.

(a) A metal deposition thin layer is provided to a film surface A by a gold sputtering device at a thickness of 20 to 30 nm (×nm), it is observed by an electron microscope (preferably, a scanning electron microscope) at a magnification of about 100,000 times, and areal circle equivalent diameters are determined as to at least 100 particles, and a value subtracting 2×nm from the number average value thereof is defined as the particle diameter.

(2) Number of Fine Surface Projections on Film:

For the film according to the aforementioned first aspect, the number of fine projections formed on a surface of a film is determined by observing the film surface by a scanning electron microscope at a magnification of about 30,000 times to about 50,000 times with respect to 10 visual fields or more, and determining how many projections viewed as a projection-like shape there are in 1 mm$^2$.

(3) Number of Surface Defects with a Height of 120 nm or More Attributed to Foreign Matter in Film:

A film surface A is observed using an optical microscope (observation magnification: 100 times), projections viewed as a projection-like shape are surface defects attributed to foreign matter in the film, the projections are marked, and the height of the marked projection is confirmed using a laser microscope produced by Keyence Corporation (a surface shape measuring microscope: VF-7500) as to whether it is 120 nm or more or not. The number in the observed area is converted into a number in 100 cm$^2$, and the converted number is defined as the number of surface defects with a height of 120 nm or more attributed to foreign matter in the film.

The determination from a magnetic tape is carried out by, after magnetic recording, coating a magnetic colloid onto the surface of the magnetic tape and observing the coated surface by an optical microscope (observation magnification: 100 times). A portion on the coated surface, in which a magnetic recording is missing, is marked, and the height of the marked defect is confirmed using a laser microscope produced by Keyence Corporation (a surface shape measuring microscope: VF-7500) as to whether it is 120 nm or more or not. The number in the observed area is converted into a number in 100 cm$^2$, and the converted number is defined as the number of surface defects with a height of 120 nm or more attributed to foreign matter in the film.

(4) Content of titanium compound, phosphorous compound, antimony compound and germanium compound in polyester forming film:

The content of Ti, P. Sb and Ge contained in a polyester in a polyester film is determined by fluorescent X-ray (FLX) method, using a fluorescent X-ray element analysis device (produced by Horiba Ltd.: type MESA-500W). In a case where these elements are not contained in additives or coating layer, the whole of the film may be determined as a sample.

(5) Intrinsic Viscosity IV of Polyester:

It is determined at 25° C. using orthochlorophenol as a solvent.

(6) Diameter of Fine Surface Projection on Film:

5 fields of a film surface are observed by a scanning electron microscope at a magnification of 50,000 times, 10 projections viewed as a projection-like shape are randomly selected from each field, the maximum and minimum diameters of each projection are determined, the average value thereof is defined as the diameter of the projection, an average value of diameters of 50 projections is determined, and it is defined as the diameter of fine surface projection formed on the surface of the film.

(7) Number of Adhered Heavy Metal Foreign Matters with a Width of 15 μm or more:

Determination Method on Base Film:

A surface of a coating layer of a film is observed using a differential interference optical microscope (observation magnification: 100 times), and foreign matters each spreading at a width of 15 μm or more, which are present on the film surface, are marked. The marked foreign matters are observed by a scanning electron microscope-X-ray micro-analysis (SEM-XMA), and foreign matters, which adhere to the surface and contain heavy metals such as antimony, germanium, etc., are selected. This observation by the optical microscope is carried out within a portion of the film having a length of 2 m and a width of 1 m, the number of the marked and selected adhered foreign matters is counted, a rate of heavy metal components of the adhered foreign matters is determined, and it is defined as the number of adhered heavy metal foreign matters with a width of 15 μm or more per 2 m$^2$.

Determination Method on Magnetic Base Film:

As shown the item of evaluation of properties of a magnetic tape (DVCAM tape) described later, DO generation portion of a magnetic tape recorded and image recorded is magnetically developed, a magnetic layer portion missing a magnetic recording is removed, a base film portion is observed by SEM-XMA analysis, a cause of DO is analyzed, it is determined whether it is caused by adhered heavy metal foreign matters with a width of 15 μm or more or not, and the number thereof is counted and determined similarly to the above-described method.

(8) Surface Roughness of Film, Ra Value and Rz Value:

The surface roughnesses of a film, Ra value and Rz value, are determined using an atomic force microscope (a scanning probe microscope). Namely, using a desk-top small probe microscope produced by Seiko Instruments Inc. ("Nanopics" 1000), scanning for measurement of the atomic force microscope is carried out on the surface of the film within 4 μm square at a damping mode, Ra is determined from the arithmetic average roughness corresponding to JIS•B0601•Ra determined from the profile curve of the film surface, and Rz is determined from the ten-point average roughness. The magnification in a plane direction is about 10,000 times to about 50,000 times, and the magnification in a height direction is about 1,000,000 times.

(9) Dust Degree of Air:

According to Federal Standard of the United States of America, Fed'Std-209D, the number of fine particles with a diameter of 0.5 μm or more per 1 cubic feet air is defined as a class of dust degree indicating a dust environment of air. The measurement of the fine particle concentration is carried out by a particle counter by light scattering method.

(8) Thickness of Cover Layer:

The thickness of a cover layer is determined by multiplying a thickness of a coating solution at the time of coating by a solid component concentration, and dividing it with a solid component density and a draw ratio after coating. In a case where this thickness of the cover layer is determined from the film, it is determined by the following method (a), etc.

(a) A small piece of film is fixed by a resin, the film is cut in a direction parallel to its longitudinal direction to make a very thin cut sample of the film section, it is observed by a transmission electron microscope at a magnification of 100,000 times or more, and the thickness of the cover layer is determined from a distance between the interface of the cover layer/film and the interface of the cover layer/the resin.

(11) Evaluation of Properties of Magnetic Tape (DVCAM Tape):

Using a DVCAM digital camcorder on the market (produced by Sony Corporation: DSR-300), DO number of a standard DVCAM cassette tape over 180 minutes is determined. Namely, recording is carried out for 180 minutes in a quiet room using DSR-300, and the property of the DVCAM tape is evaluated by counting the number of block-like mosaic appearing on the display at the time of regeneration (number of dropouts (DO)). The number of DO is determined at the time of first regeneration after recording and at the time after repeated regeneration of 100 times (300 hours). A smaller value of DO is better.

Next, our films and methods will be explained based on examples.

Example 1

Process for Producing Polyethylene Terephthalate

A slurry of high-purity terephthalic acid of 100 kg (produced by Mitsui Chemicals, Inc.) and ethylene glycol of 45 kg (produced by Nippon Shokubai Corporation) was supplied in order for 4 hours to an esterification reaction vessel, into which about 123 kg of bis(hydroxyethyl) terephthalate had been put beforehand and the temperature in which was maintained at 250° C. and the pressure in which was maintained at $1.2 \times 10^5$ Pa, esterification was further carried out for 1 hour even after completion of the supply, and 123 kg of the product material by the esterification was transferred to a condensation polymerization vessel.

Subsequently, ethylene glycol was added to the condensation polymerization vessel transferred with the product material by the esterification at 0.3 wt % relative to polymer to be obtained. After stirring for 5 minutes, ethylene glycol solution of cobalt acetate and manganese acetate was added so that the content of cobalt at an atom equivalent relative to polymer to be obtained became 30 ppm and the content of manganese at an atom equivalent relative to polymer to be obtained became 15 ppm. After further stirring for 5 minutes, ethylene glycol solution of 2 wt % titanium alkoxide compound was added so that the content of titanium at an atom equivalent relative to polymer to be obtained became 5 ppm, after 5 minutes, ethylene glycol solution of 10 wt % diethylphosphono ethylacetate was added so that the content of phosphorous at an atom equivalent relative to polymer to be obtained became 5 ppm, and thereafter, while the low-polymerized material was stirred at 30 rpm, the temperature of the reaction system was gradually elevated from 250° C. to 285° C. and the pressure was reduced down to 40 Pa. The times for reaching the final temperature and for reaching the final pressure were both set at 60 minutes. The reaction system was purged with nitrogen at the time when the stirring torque reached a predetermined value, returned to a normal pressure, condensation polymerization was stopped, and the polymer was discharged into a cold water at a strand-like form and immediately cut to make polymer pellets. The time from start of pressure reduction to reaching the predetermined stirring torque was 3 hours.

IV of the obtained polymer was 0.66, the melting point of the polymer was 259° C., and the haze of solution was 0.7%. Further, it was confirmed that the content of titanium atom attributed to the titanium catalyst, determined from the polymer, was 5 ppm, the content of phosphorus atom was 5 ppm, Ti/P was 1, and the content of antimony and the content of germanium were both 0 ppm.

In the above-described polymerization process, a product synthesized by the following method was used for the titanium alkoxide compound added as a catalyst.

Ethylene glycol (496 g, 8.00 mol) was added from a dropping funnel to titanium tetraisopropoxide (285 g, 1.00 mol) being stirred in a 2 L flask with a stirrer, a condenser and a temperature sensor. The addition speed was adjusted so that the reaction heat heated the substances in the flask at about 50° C. An aqueous solution of 32 wt/wt % NaOH (125 g, 1.00 mol) was gradually added by a dropping funnel to the reaction flask to prepare a transparent, yellow liquid-like titanium alkoxide compound (Ti content: 4.44 wt %).

[Process for Producing Polyester Film]

Raw material A, which was prepared by adding silica with a mean particle diameter of 60 nm at a content of 0.03 wt % to the polyethylene terephthalate obtained by the polymerization of the above-described process and substantially not containing any inert particles, and raw material B prepared by containing aluminum silicate with a mean particle diameter of 190 nm in the same polyethylene terephthalate at a content of 0.15 wt %, were coextruded at a thickness ratio of 5:1, it was brought into contact with a cooling drum to form a sheet, and the sheet was stretched in the longitudinal direction by roll stretching method at a temperature of 110° C. and a draw ration of 3.0 times. A high-precision filter having a performance of 1.2 μm cut (95% cut diameter) was provided to the extrusion system of the raw material A.

In a process after the longitudinal stretching, an aqueous solution having the following composition, maintained at a temperature of 25° C., was applied to the outside of the surface A of the raw material A side and the outside of the surface B of the raw material B side, respectively, after filtering by a filter having a filtration accuracy of 0.8 μm, so that the solid component became 25 mg/m² and 50 mg/m², respectively.

| Aqueous coating solution onto the outside of surface A: | |
|---|---|
| Methyl cellulose: | 0.10 wt % |
| Water soluble polyester (=1:1 copolymer of an acid component of 70 mol % terephthalic acid and 30 mol % 5-sodium sulfoisophthalic acid and ethylene glycol): | 0.30 wt % |
| Amino-modified silicone: | 0.004 wt % |
| Fine silica with a mean particle diameter of 18 nm: | 0.01 wt % |
| Aqueous coating solution onto the outside of surface B: | |
| Methyl cellulose: | 0.20 wt % |
| Water soluble polyester (=1:1 copolymer of an acid component of 70 mol % terephthalic acid and 30 mol % 5-sodium sulfoisophthalic acid and ethylene glycol): | 0.60 wt % |
| Aminoethylsilane coupling agent: | 0.05 wt % |
| Amino-modified silicone: | 0.05 wt % |
| Fine silica with a mean particle diameter of 18 nm: | 0.10 wt % |

Thereafter, the film was stretched in a stenter in the transverse direction at a temperature of 102° C. and a draw ratio of 4.2 times, heat treated at a temperature of 215° C., wound at a form of intermediate spool, slit by a slitter at a small width, wound on a cylindrical core at a form of a roll, and a polyester film with a thickness of 6.3 μm was prepared. The mean thickness of the coating layer on the outside of the surface A was about 6 nm.

A cobalt-oxygen thin layer was formed on the surface A of this polyester film at a thickness of 150 nm by vacuum deposition. Then, a diamond-like carbon layer was formed on the cobalt-oxygen thin layer at a thickness of 10 nm by sputtering, and a fluorine containing fatty acid ester group lubricant was applied at a thickness of 3 nm. Subsequently, a backcoat layer comprising carbon black, polyurethane and silicone was provided on the surface B at a thickness of 500 nm, and it was slit by a slitter at a width of 6.35 mm, and wound on a reel at a length of 311 m to make a magnetic tape (a standard tape for DVCAM).

The properties of the polyester film and magnetic tape obtained are shown in Table 1. Ra and Rz values of the surface B of the polyester film were 8 nm and 150 nm, respectively.

Example 2

In the production of the base film in Example 1, polyethylene terephthalate was changed to polyethylene-2,6-naphthalate, the contents of silica and aluminum silicate in the raw materials A and B were changed to 0.075 wt % and 0.45 wt %, respectively, the temperature and the draw ratio of the longitudinal stretching were set at 135° C. and 5.0 times, the solid component concentrations of application on the outsides of the layers A and B were changed to 50 mg/m² and 100 mg/m², respectively, the temperature and the draw ratio of the transverse stretching were changed to 135° C. and 6.5 times, respectively, the temperature of the heat treatment was changed to 200° C., and the other conditions were set at the same conditions as those in Example 1, a polyester film with a thickness of 4.7 μm was prepared. A magnetic tape with a width of 6.35 mm and a length of 417 m was made from the obtained polyester film similarly to in Example 1. The properties of the polyester film and magnetic tape obtained are shown in Table 1. The mean thickness of the coating layer on the outside of the layer A of the polyester film was about 8 nm, and Ra and Rz values of the surface B were 10 nm and 160 nm, respectively.

Example 3

In the production of the base film in Example 1, a polyester film was prepared at the same conditions as those in Example 1 other than a condition where silica with a mean particle diameter of 60 nm in the raw material A was not used, and further, a magnetic tape with a width of 6.35 mm and a length of 311 m was made. The properties of the polyester film and magnetic tape obtained are shown in Table 1. Ra and Rz values of the surface B were 8 nm and 150 nm, respectively.

Comparative Example 1

In the production of the base film in Example 1, the solid component concentration at the time of application of the aqueous solution on the outside of the layer A was changed to 5 mg/m². The other conditions were set at the same conditions as those in Example 1, a polyester film with a thickness of 6.3 μm was prepared, and further, a magnetic tape with a width of 6.35 mm and a length of 311 m was, made. The properties of the polyester film and magnetic tape obtained are shown in Table 1. The mean thickness of the coating layer on the outside of the layer A of the polyester film was about 1 nm, and Ra and Rz values of the surface B were 8 nm and 150 nm, respectively.

Comparative Example 2

In the production of the base film in Example 1, the concentration of the fine silica in the aqueous coating solution applied onto the outside of the layer A was changed to 0.09 wt %, and the solid component concentration at the time of application of the aqueous solution was changed to 80 mg/m². The other conditions were set at the same conditions as those in Example 1, a polyester film with a thickness of 6.3 μm was prepared, and further, a magnetic tape with a width of 6.35 mm and a length of 311 m was made. The properties of the polyester film and magnetic tape obtained are shown in Table 1. The mean thickness of the coating layer on the outside of the layer A of the polyester film was about 19 nm, and Ra and Rz values of the surface B were 8 nm and 150 nm, respectively.

Comparative Example 3

In the production of the base film in Example 1, the particle diameter of the fine silica in the aqueous coating solution applied onto the outside of the layer A was changed to 4 nm, and the solid component concentration at the time of application of the aqueous solution was changed to 10 mg/m². The other conditions were set at the same conditions as those in Example 1, a polyester film with a thickness of 6.3 μm was prepared, and further, a magnetic tape with a width of 6.35 mm and a length of 311 m was made. The properties of the polyester film and magnetic tape obtained are shown in Table 1. The mean thickness of the coating layer on the outside of the layer A of the polyester film was about 2 nm, and Ra and Rz values of the surface B were 8 nm and 150 nm, respectively.

Comparative Example 4

In the production of the base film in Example 1, the particle diameter of the fine silica in the aqueous coating solution applied onto the outside of the layer A was changed to 70 nm, and the content of the silica was changed to 0.08 wt %. The other conditions were set at the same conditions as those in Example 1, a polyester film with a thickness of 6.3 μm was prepared, and further, a magnetic tape with a width of 6.35 mm and a length of 311 m was made. The properties of the polyester film and magnetic tape obtained are shown in Table 1. Ra and Rz values of the surface B of the polyester film were 8 nm and 150 nm, respectively.

Comparative Example 5

A polymer raw material, prepared by mixing the polyethylene terephthalate due to titanium compound catalyst obtained in Example 1 and a conventional usual polyethylene terephthalate (due to antimony catalyst, due to germanium catalyst), was used. The element contents of this mixture polymer raw material were those as shown in Table 1.

Polyethylene terephthalate due to antimony catalyst: A usual antimony-group catalyst was used as the catalyst to be added in the polymerization process of polyethylene terephthalate, and polyethylene terephthalate with an IV of 0.66 was produced by a usual method (the atom content of titanium in the polyester was 0 ppm, the atom content of phosphorus was 10 ppm, the atom content of antimony was 80 ppm, and the atom content of germanium was 0 ppm).

Polyethylene terephthalate due to germanium catalyst: A usual germanium-group catalyst was used as the catalyst to be added in the polymerization process of polyethylene terephthalate, and polyethylene terephthalate with an IV of 0.66 was produced by a usual method (the atom content of titanium in the polyester was 0 ppm, the atom content of phosphorus was 10 ppm, the atom content of antimony was 0 ppm, and the atom content of germanium was 40 ppm).

In the production of the base film in Example 1, the polyester raw material for film production was changed to the above-described mixture polymer raw material. The other conditions were set at the same conditions as those in Example 1, a polyester film with a thickness of 6.3 μm was prepared, and further, a magnetic tape with a width of 6.35 mm and a length of 311 m was made. The properties of the polyester film and magnetic tape obtained are shown in Table 1. Ra and Rz values of the surface B of the polyester film were 8 nm and 150 nm, respectively.

Comparative Example 6

In the production of polyester in Example 1, the content of titanium alkoxide compound used as polymerization catalyst was changed so that the content of titanium at an atom equivalent relative to polymer to be obtained became 1 ppm, and further, the content of ethylene glycol solution of 10 wt % diethylphosphono ethylacetate was changed so that the content of phosphorus at an atom equivalent relative to polymer to be obtained became 1 ppm, the polymerization was carried out setting the other conditions at the same conditions as those in Example 1, and a polyester with element contents shown in Table 1 was produced.

Using the obtained polyester, and setting the other conditions at the same conditions as those in Example 1, a polyester film with a thickness of 6.3 μm was prepared, and further, a magnetic tape with a width of 6.35 mm and a length of 311 m was made. The properties of the polyester film and magnetic tape obtained are shown in Table 1. Ra and Rz values of the surface B of the polyester film were 8 nm and 150 nm, respectively.

Comparative Example 7

In the production of polyester in Example 1, the content of titanium alkoxide compound used as polymerization catalyst was changed so that the content of titanium at an atom equivalent relative to polymer to be obtained became 10 ppm, and further, the content of ethylene glycol solution of 10 wt % diethylphosphono ethylacetate was changed so that the content of phosphorus at an atom equivalent relative to polymer to be obtained became 6 ppm, the polymerization was carried out setting the other conditions at the same conditions as those in Example 1, and a polyester with element contents shown in Table 1 was produced.

Using the obtained polyester, and setting the other conditions at the same conditions as those in Example 1, a polyester film with a thickness of 6.3 μm was prepared, and further, a magnetic tape with a width of 6.35 mm and a length of 311 m was made. The properties of the polyester film and magnetic tape obtained are shown in Table 1. Ra and Rz values of the surface B of the polyester film were 8 nm and 150 nm, respectively.

Comparative Example 8

In the production of polyester in Example 1, the content of ethylene glycol solution of 10 wt % diethylphosphono ethylacetate was changed so that the content of phosphorus at an atom equivalent relative to polymer to be obtained became 0.1 ppm, the polymerization was carried out setting the other conditions at the same conditions as those in Example 1, and a polyester with element contents shown in Table 1 was produced.

Using the obtained polyester, and setting the other conditions at the same conditions as those in Example 1, a polyester film with a thickness of 6.3 μm was prepared, and further, a magnetic tape with a width of 6.35 mm and a length of 311 m was made. The properties of the polyester film and magnetic tape obtained are shown in Table 1. Ra and Rz values of the surface B of the polyester film were 8 nm and 150 nm, respectively.

Comparative Example 9

In the production of polyester in Example 1, the content of ethylene glycol solution of 10 wt % diethylphosphono ethylacetate was changed so that the content of phosphorus at an atom equivalent relative to polymer to be obtained became 12 ppm, the polymerization was carried out setting the other conditions at the same conditions as those in Example 1, and a polyester with element contents shown in Table 1 was produced.

Using the obtained polyester, and setting the other conditions at the same conditions as those in Example 1, a polyester film with a thickness of 6.3 μm was prepared, and further, a magnetic tape with a width of 6.35 mm and a length of 311 m was made. The properties of the polyester film and magnetic tape obtained are shown in Table 1. Ra and Rz values of the surface B of the polyester film were 8 nm and 150 nm, respectively.

Comparative Example 10

In the production of polyester in Example 1, the polyester raw material was changed to the polyethylene terephthalate polymerized by antimony catalyst, produced in Comparative Example 5, and setting the other conditions at the same conditions as those in Example 1, a polyester film with a thickness of 6.3 μm was prepared, and further, a magnetic tape with a width of 6.35 mm and a length of 311 m was made. The properties of the polyester film and magnetic tape obtained are shown in Table 1. Ra and Rz values of the surface B of the polyester film were 8 nm and 150 nm, respectively.

Comparative Example 11

In the production of polyester in Example 1, the polyester raw material was changed to the polyethylene terephthalate polymerized by germanium catalyst, produced in Comparative Example 5, and setting the other conditions at the same conditions as those in Example 1, a polyester film with a thickness of 6.3 μm was prepared, and further, a magnetic tape with a width of 6.35 mm and a length of 311 m was made. The properties of the polyester film and magnetic tape obtained are shown in Table 1. Ra and Rz values of the surface B of the polyester film were 8 nm and 150 nm, respectively.

Comparative Example 12

In the production of polyester in Example 1, the content of titanium alkoxide compound used as polymerization catalyst was changed so that the content of titanium at an atom equivalent relative to polymer to be obtained became 3 ppm, and further, the content of ethylene glycol solution of 10 wt % diethylphosphono ethylacetate was changed so that the content of phosphorus at an atom equivalent relative to polymer to be obtained became 8 ppm, the polymerization was carried out setting the other conditions at the same conditions as those in Example 1, and a polyester with element contents shown in Table 1 was produced.

Using the obtained polyester, and setting the other conditions at the same conditions as those in Example 1, a polyester film with a thickness of 6.3 μm was prepared, and further, a magnetic tape with a width of 6.35 mm and a length of 311 m was made. The properties of the polyester film and magnetic tape obtained are shown in Table 1. Ra and Rz values of the surface B of the polyester film were 8 nm and 150 nm, respectively.

TABLE 1

| | Properties of polyester film | | | | | | | Property of DVCAM tape | |
|---|---|---|---|---|---|---|---|---|---|
| | | | | | | Particle diameter of fine particles in coating layer (nm) | Surface A of coating layer | | Number of DO |
| | Content of element in polyester | | | | | | Number of fine surface projections (number/mm$^2$) | Surface defect with a height of 120 nm or more attributed to foreign matter in film (number/100 cm$^2$) | |
| | Ti (ppm) | P (ppm) | Ti/P | Sb (ppm) | Ge (ppm) | | | | First time (number/3 hours) | After repeated regeneration of 100 times (number/3 hours) |
| Example 1 | 5 | 5 | 1.0 | 0 | 0 | 18 | 7 million | 20 | 0 | 0 |
| Example 2 | 5 | 5 | 1.0 | 0 | 0 | 18 | 5 million | 15 | 0 | 0 |
| Example 3 | 5 | 5 | 1.0 | 0 | 0 | 18 | 7 million | 20 | 0 | 1 |
| Comparative Example 1 | 5 | 5 | 1.0 | 0 | 0 | 18 | 1.5 million | 20 | 0 | 100 |
| Comparative Example 2 | 5 | 5 | 1.0 | 0 | 0 | 18 | 140 million | 20 | 100 | 100 |
| Comparative Example 3 | 5 | 5 | 1.0 | 0 | 0 | 4 | 9.5 million | 20 | 0 | 200 |
| Comparative Example 4 | 5 | 5 | 1.0 | 0 | 0 | 70 | 0.3 million | 20 | 323 | 400 |
| Comparative Example 5 | 5 | 5 | 1.0 | 4 | 4 | 18 | 7 million | 50 | 50 | 50 |
| Comparative Example 6 | 1 | 1 | 1.0 | 0 | 0 | 18 | 7 million | 120 | 120 | 120 |
| Comparative Example 7 | 10 | 6 | 1.7 | 0 | 0 | 18 | 7 million | 150 | 150 | 150 |
| Comparative Example 8 | 5 | 0.1 | 50 | 0 | 0 | 18 | 7 million | 100 | 100 | 100 |
| Comparative Example 9 | 5 | 12 | 0.4 | 0 | 0 | 18 | 7 million | 90 | 90 | 90 |
| Comparative Example 10 | 0 | 10 | 0 | 80 | 0 | 18 | 7 million | 210 | 210 | 210 |
| Comparative Example 11 | 0 | 10 | 0 | 0 | 40 | 18 | 7 million | 190 | 190 | 190 |
| Comparative Example 12 | 3 | 8 | 0.4 | 0 | 0 | 18 | 7 million | 100 | 100 | 100 |

As is evident from the properties shown in Table 1, in a DVCAM tape produced using the polyester film, DO was little over the entire length for 3 hours, DO after repeated regeneration was also little, and it was an excellent magnetic tape.

Thus, in the film according to the first aspect, can be obtained a magnetic recording tape capable of making a deposition type magnetic tape for DVCAM little in dropout and excellent in durability, and a polyester film for recording medium suitable therefor. This magnetic recording tape is suitable particularly as a long-time recording magnetic tape for recording digital data such as a digital video cassette tape or a data storage tape, and improvement of image quality over a long time and reduction of error rate can be achieved.

Example 4

Production of Polyethylene Terephthalate Due to Titanium Compound Catalyst

A slurry of high-purity terephthalic acid of 100 kg (produced by Mitsui Chemicals, Inc.) and ethylene glycol of 45 kg (produced by Nippon Shokubai Corporation) was supplied in order for 4 hours to an esterification reaction vessel, into which about 123 kg of bis(hydroxyethyl) terephthalate had been put beforehand and the temperature in which was maintained at 250° C. and the pressure in which was maintained at $1.2 \times 10^5$ Pa, esterification was further carried out for 1 hour even after completion of the supply, and 123 kg of the product material by the esterification was transferred to a condensation polymerization vessel.

Subsequently, ethylene glycol solution of magnesium acetate was added to the condensation polymerization vessel transferred with the product material by the esterification so that the content of magnesium became 30 ppm at an atom equivalent relative to polymer to be obtained. Further, after stirring for 5 minutes, ethylene glycol solution of 2 wt % citric acid chelate titanium compound was added so that the content of titanium at an atom equivalent relative to polymer to be obtained became 5 ppm, and after 5 minutes, ethylene glycol solution of 10 wt % diethylphosphono ethylacetate was added so that the content of phosphorus at an atom equivalent relative to polymer to be obtained became 5 ppm, and thereafter, while the low-polymerized material was stirred at 30 rpm, the temperature of the reaction system was gradually elevated from 250° C. to 285° C. and the pressure was reduced down to 40 Pa. The times for reaching the final temperature and for reaching the final pressure were both set at 60 minutes. The reaction system was purged with nitrogen at the time when the stirring torque reached a predetermined value, returned to a normal pressure, the condensation polymerization was stopped, and the polymer was discharged into a cold water at a strand-like form and immediately cut to make polymer pellets. The time from start of pressure reduction to reaching the predetermined stirring torque was 3 hours.

IV of the obtained polymer was 0.66, the melting point of the polymer was 259° C., and the haze of solution was 0.7%. Further, it was confirmed that the content of titanium atom attributed to the titanium catalyst, determined from the polymer, was 5 ppm, the content of phosphorus atom was 5 ppm, Ti/P was 1, and the content of antimony and the content of germanium were both 0 ppm.

In the above-described polymerization process, a product synthesized by the following method was used for the citric acid chelate titanium compound added as a catalyst.

Citric acid•monohydrate (532 g, 2.52 mol) was dissolved in hot water (371 g) in a 3 L flask with a stirrer, a condenser and a temperature sensor. Titanium tetraisopropoxide (288 g, 1.00 mol) is slowly added to this solution being stirred from a dropping funnel. This mixture was heated and served to reflux for 1 hour to prepare a cloud solution, and by this, isopropanol/water mixture was distilled under a vacuum condition. The product was cooled down to a temperature lower than 70° C., and an aqueous solution of 32 wt % NaOH (380 g, 3.04 mol) was gradually added by a dropping funnel to the solution being stirred. The obtained product was filtered, it was then mixed with ethylene glycol (504 g, 80 mol), and heated under a vacuum condition to remove isopropanol/water from it, and as a result, a slightly cloud light-yellow citric acid chelate titanium compound (content of Ti: 3.85 wt %) was obtained.

Raw material A, which was prepared by adding silica with a mean particle diameter of 60 nm at a content of 0.03 wt % to the polyethylene terephthalate obtained by the polymerization of the above-described process and substantially not containing any inert particles, and raw material B prepared by containing aluminum silicate with a mean particle diameter of 190 nm in the same polyethylene terephthalate at a content of 0.15 wt %, were molten, respectively, and they were delivered out from a slit of a die in a form of a sheet at a thickness ratio of 5:1, the sheet was cooled by bringing it into contact with a cooling drum, and it was stretched in the longitudinal direction by roll stretching method at a temperature of 110° C. and a draw ratio of 3.0 times. At that time, air passing through a middle-performance filter was blown to the vicinity of the slit of the die, and the dust environment was maintained at a class of 10,000. Further, polyester oligomer-like soil adhered to the slit of the die at a form of an icicle was cleaned by suction using a vacuum cleaner at intervals of 4 hours.

In a process after the longitudinal stretching, an aqueous solution having the following composition, maintained at a temperature of 25° C., was applied to the outside of the surface A of the raw material A side and the outside of the surface B of the raw material B side, respectively, after filtering by a filter having a filtration accuracy of 0.8 µm, so that the solid component became 25 mg/m$^2$ and 50 mg/m$^2$, respectively.

| Aqueous coating solution onto the outside of surface A: | |
|---|---|
| Methyl cellulose: | 0.10 wt % |
| Water soluble polyester (=1:1 copolymer of an acid component of 70 mol % terephthalic acid and 30 mol % 5-sodium sulfoisophthalic acid and ethylene glycol): | 0.30 wt % |
| Amino-modified silicone: | 0.004 wt % |
| Fine silica with a mean particle diameter of 18 nm: | 0.02 wt % |
| Aqueous coating solution onto the outside of surface B: | |
| Methyl cellulose: | 0.20 wt % |
| Water soluble polyester (=1:1 copolymer of an acid component of 70 mol % terephthalic acid and 30 mol % 5-sodium sulfoisophthalic acid and ethylene glycol): | 0.60 wt % |
| Aminoethylsilane coupling agent: | 0.02 wt % |
| Amino-modified silicone: | 0.05 wt % |
| Fine silica with a mean particle diameter of 18 nm: | 0.10 wt % |

Thereafter, the film was stretched in a stenter in the transverse direction at a temperature of 102° C. and a draw ratio of 4.2 times, heat treated at a temperature of 215° C., wound at a form of intermediate spool, slit by a slitter at a small width, wound on a cylindrical core at a form of a roll, and a polyester film with a thickness of 6.3 µm was prepared.

A cobalt-oxygen thin layer was formed on the surface A of this polyester film at a thickness of 150 nm by vacuum deposition. Then, a diamond-like carbon layer was formed on the cobalt-oxygen thin layer at a thickness of 10 nm by sputtering, and a fluorine containing fatty acid ester group lubricant was applied at a thickness of 3 nm. Subsequently, a backcoat layer comprising carbon black, polyurethane and silicone was provided on the surface B at a thickness of 500 nm, and it was slit by a slitter at a width of 6.35 mm, and wound on a reel at a length of 311 m to make a magnetic tape (a standard tape for DVCAM).

The properties of the polyester film and magnetic tape obtained are shown in Table 2. Ra and Rz values of the surface B of the polyester film were 8 nm and 150 nm, respectively.

Example 5

In the production of the base film in Example 4, polyethylene terephthalate was changed to polyethylene-2,6-naphthalate, the contents of silica and aluminum silicate in the raw materials A and B were changed to 0.075 wt % and 0.45 wt %, respectively, the temperature and the draw ratio of the longitudinal stretching were set at 135° C. and 5.0 times, the solid component concentrations of application on the outsides of the layers A and B were changed to 50 mg/m² and 100 mg/m², respectively, the temperature and the draw ratio of the transverse stretching were changed to 135° C. and 6.5 times, respectively, the temperature of the heat treatment was changed to 200° C., and the other conditions were set at the same conditions as those in Example 4, a polyester film with a thickness of 4.7 μm was prepared. A magnetic tape with a width of 6.35 mm and a length of 417 m was made from the obtained polyester film similarly to in Example 4. The properties of the polyester film and magnetic tape obtained are shown in Table 2. Ra and Rz values of the surface B of the polyester film were 10 nm and 160 nm, respectively.

Example 6

In the production of the base film in Example 4, a polyester film with a thickness of 6.3 μm was prepared at the same conditions as those in Example 4 other than a condition where silica with a mean particle diameter of 60 nm in the raw material A was not used, and further, a magnetic tape with a width of 6.35 mm and a length of 311 m was made. The properties of the polyester film and magnetic tape obtained are shown in Table 2. Ra and Rz values of the surface B were 8 nm and 150 nm, respectively.

Comparative Example 13

In the production of the base film in Example 4, the solid component concentration at the time of application of the aqueous solution on the outside of the layer A was changed to 5 mg/m². The other conditions were set at the same conditions as those in Example 4, a polyester film with a thickness of 6.3 μm was prepared, and further, a magnetic tape with a width of 6.35 mm and a length of 311 m was made. The properties of the polyester film and magnetic tape obtained are shown in Table 2. Ra and Rz values of the surface B were 8 nm and 150 nm, respectively.

Comparative Example 14

In the production of the base film in Example 4, the concentration of the fine silica in the aqueous coating solution applied onto the outside of the layer A was changed to 0.09 wt %, and the solid component concentration at the time of application of the aqueous solution was changed to 130 mg/m². The other conditions were set at the same conditions as those in Example 4, a polyester film with a thickness of 6.3 μm was prepared, and further, a magnetic tape with a width of 6.35 mm and a length of 311 m was made. The properties of the polyester film and magnetic tape obtained are shown in Table 2. Ra and Rz values of the surface B of the polyester film were 8 nm and 150 nm, respectively.

Comparative Example 15

In the production of the base film in Example 4, the particle diameter of the fine silica in the aqueous coating solution applied onto the outside of the layer A was changed to 4 mm, and the solid component concentration at the time of application of the aqueous solution was changed to 10 mg/m². The other conditions were set at the same conditions as those in Example 4, a polyester film with a thickness of 6.3 μm was prepared, and further, a magnetic tape with a width of 6.35 mm and a length of 311 m was made. The properties of the polyester film and magnetic tape obtained are shown in Table 2. Ra and Rz values of the surface B of the polyester film were 8 nm and 150 nm, respectively.

Comparative Example 16

In the production of the base film in Example 4, the particle diameter of the fine silica in the aqueous coating solution applied onto the outside of the layer A was changed to 70 nm, and the content of the silica was changed to 0.08 wt %. The other conditions were set at the same conditions as those in Example 4, a polyester film with a thickness of 6.3 μm was prepared, and further, a magnetic tape with a width of 6.35 mm and a length of 311 m was made. The properties of the polyester film and magnetic tape obtained are shown in Table 2. Ra and Rz values of the surface B of the polyester film were 8 nm and 150 nm, respectively.

Comparative Example 17

A polymer raw material, prepared by mixing the polyethylene terephthalate due to titanium compound catalyst obtained in Example 4 and a conventional usual polyethylene terephthalate (due to antimony catalyst, due to germanium catalyst), was used. The element contents of this mixture polymer raw material were those as shown in Table 2.

Polyethylene terephthalate due to antimony catalyst: A usual antimony-group catalyst was used as the catalyst to be added in the polymerization process of polyethylene terephthalate, and polyethylene terephthalate with an IV of 0.66 was produced by a usual method (the atom content of titanium in the polyester was 0 ppm, the atom content of phosphorus was 10 ppm, the atom content of antimony was 80 ppm, and the atom content of germanium was 0 ppm).

Polyethylene terephthalate due to germanium catalyst: A usual germanium-group catalyst was used as the catalyst to be added in the polymerization process of polyethylene terephthalate, and polyethylene terephthalate with an IV of 0.66 was produced by a usual method (the atom content of titanium in the polyester was 0 ppm, the atom content of phosphorus was 10 ppm, the atom content of antimony was 0 ppm, and the atom content of germanium was 40 ppm).

In the production of the base film in Example 4, the polyester raw material for film production was changed to the above-described mixture polymer raw material. The other conditions were set at the same conditions as those in Example 4, a polyester film with a thickness of 6.3 μm was prepared, and further, a magnetic tape with a width of 6.35 mm and a length of 311 m was made. The properties of the polyester film and magnetic tape obtained are shown in Table 2. Ra and Rz values of the surface B of the polyester film were 8 nm and 150 nm, respectively.

Comparative Example 18

In the production of polyester in Example 4, the content of citric acid chelate titanium compound used as polymerization catalyst was changed so that the content of titanium at an atom equivalent relative to polymer to be obtained became 1 ppm, and further, the content of ethylene glycol solution of 10 wt % diethylphosphono ethylacetate was changed so that the content of phosphorus at an atom equivalent relative to polymer to be obtained became 1 ppm, the polymerization was carried out setting the other conditions at the same conditions as those in Example 4, and a polyester with element contents shown in Table 2 was produced.

Using the obtained polyester, and setting the other conditions at the same conditions as those in Example 4, a polyester film with a thickness of 6.3 μm was prepared, and further, a magnetic tape with a width of 6.35 mm and a length of 311 m was made. The properties of the polyester film and magnetic tape obtained are shown in Table 2. Ra and Rz values of the surface B of the polyester film were 8 nm and 150 nm, respectively.

Comparative Example 19

In the production of polyester in Example 4, the content of citric acid chelate titanium compound used as polymerization catalyst was changed so that the content of titanium at an atom equivalent relative to polymer to be obtained became 10 ppm, and further, the content of ethylene glycol solution of 10 wt % diethylphosphono ethylacetate was changed so that the content of phosphorus at an atom equivalent relative to polymer to be obtained became 6 ppm, the polymerization was carried out setting the other conditions at the same conditions as those in Example 4, and a polyester with element contents shown in Table 2 was produced.

Using the obtained polyester, and setting the other conditions at the same conditions as those in Example 4, a polyester film with a thickness of 6.3 μm was prepared, and further, a magnetic tape with a width of 6.35 mm and a length of 311 m was made. The properties of the polyester film and magnetic tape obtained are shown in Table 2. Ra and Rz values of the surface B of the polyester film were 8 nm and 150 nm, respectively.

Comparative Example 20

In the production of polyester in Example 4, the content of ethylene glycol solution of 10 wt % diethylphosphono ethylacetate was changed so that the content of phosphorus at an atom equivalent relative to polymer to be obtained became 0.1 ppm, the polymerization was carried out setting the other conditions at the same conditions as those in Example 4, and a polyester with element contents shown in Table 2 was produced.

Using the obtained polyester, and setting the other conditions at the same conditions as those in Example 4, a polyester film with a thickness of 6.3 μm was prepared, and further, a magnetic tape with a width of 6.35 mm and a length of 311 m was made. The properties of the polyester film and magnetic tape obtained are shown in Table 2. Ra and Rz values of the surface B of the polyester film were 8 nm and 150 nm, respectively.

Comparative Example 21

In the production of polyester in Example 4, the content of ethylene glycol solution of 10 wt % diethylphosphono ethylacetate was changed so that the content of phosphorus at an atom equivalent relative to polymer to be obtained became 12 ppm, the polymerization was carried out setting the other conditions at the same conditions as those in Example 4, and a polyester with element contents shown in Table 2 was produced.

Using the obtained polyester, and setting the other conditions at the same conditions as those in Example 4, a polyester film with a thickness of 6.3 μm was prepared, and further, a magnetic tape with a width of 6.35 mm and a length of 311 m was made. The properties of the polyester film and magnetic tape obtained are shown in Table 2. Ra and Rz values of the surface B of the polyester film were 8 nm and 150 nm, respectively.

Comparative Example 22

In the production of polyester in Example 4, the polyester raw material was changed to the polyethylene terephthalate polymerized by antimony catalyst, produced in Comparative Example 17, and setting the other conditions at the same conditions as those in Example 4, a polyester film with a thickness of 6.3 μm was prepared, and further, a magnetic tape with a width of 6.35 mm and a length of 311 m was made. The properties of the polyester film and magnetic tape obtained are shown in Table 2. Ra and Rz values of The surface B of the polyester film were 8 nm and 150 nm, respectively.

Comparative Example 23

In the production of polyester in Example 4, the polyester raw material was changed to the polyethyleneterephthalate polymerized by germanium catalyst, produced in Comparative Example 17, and setting the other conditions at the same conditions as those in Example 4, a polyester film with a thickness of 6.3 μm was prepared, and further, a magnetic tape with a width of 6.35 mm and a length of 311 m was made. The properties of the polyester film and magnetic tape obtained are shown in Table 2. Ra and Rz values of the surface B of the polyester film were 8 nm and 150 nm, respectively.

Comparative Example 24

In the production of polyester in Example 4, the content of citric acid chelate titanium compound used as polymerization catalyst was changed so that the content of titanium at an atom equivalent relative to polymer to be obtained became 3 ppm, and further, the content of ethylene glycol solution of 10 wt % diethylphosphono ethylacetate was changed so that the content of phosphorus at an atom equivalent relative to polymer to be obtained became 8 ppm, the polymerization was carried out setting the other conditions at the same conditions as those in Example 4, and a polyester with element contents shown in Table 2 was produced.

Using the obtained polyester, and setting the other conditions at the same conditions as those in Example 4, a polyester film with a thickness of 6.3 μm was prepared, and further, a magnetic tape with a width of 6.35 mm and a length of 311 m was made. The properties of the polyester film and magnetic tape obtained are shown in Table 2. Ra and Rz values of the surface B of the polyester film were 8 nm and 150 nm, respectively.

Comparative Example 25

In the production of polyester in Example 4, the blowing of air having, passed through a middle-performance filter to the vicinity of the slit of the die was stopped. As a result, the dust environment near the slit of the die became class 50,000. A polyester film with a thickness of 6.3 μm was prepared setting the other conditions at the same conditions as those in Example 4, and further, a magnetic tape with a width of 6.35 mm and a length of 311 m was made. The properties of the polyester film and magnetic tape obtained are shown in Table 2. Ra and Rz values of the surface B of the polyester film were 8 nm and 150 nm, respectively.

Comparative Example 26

In the production of base film in Example 4, the middle-performance filter was changed to a rough filter catching rough dust with about 50 μm at about 10%. As a result, the dust environment near the slit of the die became class 25,000. A polyester film with a thickness of 6.3 μm was prepared setting the other conditions at the same conditions as those in Example 4, and further, a magnetic tape with a width of 6.35 mm and a length of 311 m was made. The properties of the polyester film and magnetic tape obtained are shown in Table 2. Ra and Rz values of the surface B of the polyester film were 8 nm and 150 nm, respectively.

Comparative Example 27

In the production of base film in Example 4, the frequency of the suction cleaning of polyester oligomer-like soil adhered to the slit of the die at a form of an icicle by a vacuum cleaner was reduced, and the suction cleaning was carried out at intervals of 12 hours. A polyester film with a thickness of 6.3 μm was prepared setting the other conditions at the same conditions as those in Example 4, and further, a magnetic tape with a width of 6.35 mm and a length of 311 m was made. The properties of the polyester film and magnetic tape obtained are shown in Table 2. Ra and Rz values of the surface B of the polyester film were 8 nm and 150 nm, respectively.

Comparative Example 28

In the production of polyester in Example 4, the suction cleaning of polyester oligomer-like soil adhered to the slit of the die at a form of an icicle by a vacuum cleaner was stopped. A polyester film with a thickness of 6.3 μm was prepared setting the other conditions at the same conditions as those in Example 4, and further, a magnetic tape with a width of 6.35 mm and a length of 311 m was made. The properties of the polyester film and magnetic tape obtained are shown in Table 2. Ra and Rz values of the surface B of the polyester film were 8 nm and 150 nm, respectively.

TABLE 2

| | Properties of polyester film | | | | | | | | | |
|---|---|---|---|---|---|---|---|---|---|---|
| | | | | | | | Surface of coating layer | | Property of DVCAM tape Number of DO | |
| | Content of element in polyester | | | | | Fine surface projection | | Adhered heavy metal foreign matter with a width of 15 μm or more | Surface roughness | First time | After repeated regeneration of 100 times |
| | Ti (ppm) | P (ppm) | Ti/P | Sb (ppm) | Ge (ppm) | Diameter (nm) | Number (number/mm$^2$) | (number/2 m$^2$) | Ra (nm) | (number/ 3 hours) | (number/3 hours) |
| Example 4 | 5 | 5 | 1.0 | 0 | 0 | 18 | 7 million | 0 | 2.2 | 0 | 0 |
| Example 5 | 5 | 5 | 1.0 | 0 | 0 | 18 | 5 million | 0 | 2.1 | 0 | 0 |
| Example 6 | 5 | 5 | 1.0 | 0 | 0 | 18 | 7 million | 0 | 1.8 | 0 | 1 |
| Comparative Example 13 | 5 | 5 | 1.0 | 0 | 0 | 18 | 1.5 million | 0 | 0.4 | 0 | 100 |
| Comparative Example 14 | 5 | 5 | 1.0 | 0 | 0 | 18 | 140 million | 0 | 5.3 | 100 | 100 |
| Comparative Example 15 | 5 | 5 | 1.0 | 0 | 0 | 4 | 9.5 million | 0 | 0.6 | 0 | 200 |
| Comparative Example 16 | 5 | 5 | 1.0 | 0 | 0 | 70 | 0.3 million | 0 | 4.5 | 323 | 400 |
| Comparative Example 17 | 5 | 5 | 1.0 | 4 | 4 | 18 | 7 million | 15 | 2.2 | 50 | 55 |
| Comparative Example 18 | 1 | 1 | 1.0 | 0 | 0 | 18 | 7 million | 8 | 2.2 | 8 | 8 |
| Comparative Example 19 | 10 | 6 | 1.7 | 0 | 0 | 18 | 7 million | 9 | 2.2 | 9 | 9 |
| Comparative Example 20 | 5 | 0.1 | 50 | 0 | 0 | 18 | 7 million | 6 | 2.3 | 5 | 6 |
| Comparative Example 21 | 5 | 12 | 0.4 | 0 | 0 | 18 | 7 million | 13 | 2.3 | 10 | 13 |
| Comparative Example 22 | 0 | 10 | 0 | 80 | 0 | 18 | 7 million | 23 | 2.7 | 20 | 23 |
| Comparative Example 23 | 0 | 10 | 0 | 0 | 40 | 18 | 7 million | 21 | 2.5 | 19 | 21 |
| Comparative Example 24 | 3 | 8 | 0.4 | 0 | 0 | 18 | 7 million | 10 | 2.3 | 10 | 14 |
| Comparative Example 25 | 5 | 5 | 1.0 | 0 | 0 | 18 | 7 million | 18 | 2.2 | 19 | 21 |
| Comparative Example 26 | 5 | 5 | 1.0 | 0 | 0 | 18 | 7 million | 8 | 2.2 | 7 | 12 |
| Comparative Example 27 | 5 | 5 | 1.0 | 0 | 0 | 18 | 7 million | 5 | 2.2 | 5 | 8 |
| Comparative Example 28 | 5 | 5 | 1.0 | 0 | 0 | 18 | 7 million | 15 | 2.2 | 14 | 19 |

As shown in Table 2, when the polyester film for recording medium according to the second aspect is used, even if a magnetic tape for business such as DVCAM, etc. is produced, dropouts are extremely few, and a deposition-type magnetic tape excellent in durability can be made.

Example 7

Production of Polyethylene Terephthalate Due to Titanium Compound Catalyst

A slurry of high-purity terephthalic acid of 100 kg (produced by Mitsui Chemicals, Inc.) and ethylene glycol of 45 kg (produced by Nippon Shokubai Corporation) was supplied in order for 4 hours to an esterification reaction vessel, into which about 123 kg of bis(hydroxyethyl) terephthalate had been put beforehand and the temperature in which was maintained at 250° C. and the pressure in which was maintained at $1.2 \times 10^5$ Pa, esterification was further carried out for 1 hour even after completion of the supply, and 123 kg of the product material by the esterification was transferred to a condensation polymerization vessel.

Example 7

Subsequently, ethylene glycol solution of magnesium acetate was added to the condensation polymerization vessel transferred with the product material by the esterification so that the content of magnesium became 30 ppm at an atom equivalent relative to polymer to be obtained. Further, after stirring for 5 minutes, ethylene glycol solution of 2 wt % citric acid chelate titanium compound was added so that the content of titanium at an atom equivalent relative to polymer to be obtained became 5 ppm, and after 5 minutes, ethylene glycol solution of 10 wt % diethylphosphono ethylacetate was added so that the content of phosphorus at an atom equivalent relative to polymer to be obtained became 5 ppm, and thereafter, while the low-polymerized material was stirred at 30 rpm, the temperature of the reaction system was gradually elevated from 250☐ to 285☐ and the pressure was reduced down to 40 Pa. The times for reaching the final temperature and for reaching the final pressure were both set at 60 minutes. The reaction system was purged with nitrogen at the time when the stirring torque reached a predetermined value, returned to a normal pressure, the condensation polymerization was stopped, and the polymer was discharged into a cold water at a strand-like form and immediately cut to make polymer pellets. The time from start of pressure reduction to reaching the predetermined stirring torque was 3 hours.

IV of the obtained polymer was 0.66, the melting point of the polymer was 259° C., and the haze of solution was 0.7%. Further, it was confirmed that the content of titanium atom attributed to the titanium catalyst, determined from the polymer, was 5 ppm, the content of phosphorus atom was 5 ppm, Ti/P was 1, and the content of antimony and the content of germanium were both 0 ppm.

In the above-described polymerization process, a product synthesized by the following method was used for the citric acid chelate titanium compound added as a catalyst.

Citric acid•monohydrate (532 g, 2.52 mol) was dissolved in hot water (371 g) in a 3 L flask with a stirrer, a condenser and a temperature sensor. Titanium tetraisopropoxide (288 g, 1.00 mol) is slowly added to this solution being stirred from a dropping funnel. This mixture was heated and served to reflux for 1 hour to prepare a cloud solution, and by this, isopropanol/water mixture was distilled under a vacuum condition. The product was cooled down to a temperature lower than 70° C., and an aqueous solution of 32 wt % NaOH (380 g, 3.04 mol) was gradually added by a dropping funnel to the solution being stirred. The obtained product was filtered, it was then mixed with ethylene glycol (504 g, 80 mol), and heated under a vacuum condition to remove isopropanol/water from it, and as a result, a slightly cloud light-yellow citric acid chelate titanium compound (content of Ti: 3.85 wt %) was obtained.

Production of Polyethylene Terephthalate Due to Germanium Catalyst:

A usual germanium-group catalyst was used as the catalyst to be added in the polymerization process of polyethylene terephthalate, the polymerization was carried out by a usual process, and a polyethylene terephthalate with IV of 0.66 (as to atom contents in the polyester, 0 ppm in titanium, 10 ppm in phosphorus, 0 ppm in antimony and 40 ppm in germanium) was prepared.

Raw material A, which was prepared by adding silica with a mean particle diameter of 60 nm at a content of 0.02 wt % to the polyethylene terephthalate polymerized by the above-described germanium catalyst (substantially not containing any inert particles), and raw material B prepared by containing polystyrene spheres with a mean particle diameter of 320 nm in the polyethylene terephthalate polymerized by the above-described titanium compound catalyst at a content of 0.50 wt %, were coextruded at a thickness ratio of 5:1, and the coextruded sheet was stretched in the longitudinal direction by roll stretching method at a temperature of 110° C. and a draw ratio of 3.0 times.

In a process after the longitudinal stretching, an aqueous solution having the following composition and concentration was coated onto the outside of the layer A at a coating thickness of 4.0 μm.

| Aqueous coating solution onto the outside of layer A: | |
|---|---|
| Methyl cellulose: | 0.10 wt % |
| Water soluble polyester: | 0.30 wt % |
| Aminoethylsilane coupling agent: | 0.01 wt % |
| Fine silica with a mean particle diameter of 12 nm: | 0.03 wt % |

Thereafter, the film was stretched in a stenter in the transverse direction at a temperature of 98° C. and a draw ratio of 3.3 times, heat treated at a temperature of 200° C., wound at a form of intermediate spool, slit by a slitter at a small width, wound on a cylindrical core at a form of a roll, and a composite polyester film with a thickness of 6.3 μm was prepared at a length of 20,000 m. After this roll-like polyester film was preserved in a warehouse not having a temperature control system for 3 months, a ferromagnetic metal thin layer was formed on the surface A of the polyester film by vacuum depositing a cobalt-oxygen thin layer at a thickness of 160 nm. The film conveying speed at the time of the cobalt deposition was set at 150 m/min. (1.5 times the conventional speed). Next, a diamond-like carbon layer was formed on the cobalt-oxygen thin layer at a thickness of 10 nm by sputtering. Subsequently, a backcoat layer comprising carbon black, polyurethane and silicone was provided onto the surface B at a thickness of 400 nm, and it was slit by a slitter at a width of 6.35 mm, and wound on a reel to make a magnetic tape.

The properties of the composite polyester film and magnetic tape obtained are shown in Table 3. Ra and Rz values of the surface B of the composite polyester film were 13 nm and 230 nm, respectively.

Example 8

In the production of the base film in Example 7, polyethylene terephthalate was changed to polyethylene-2,6-naphthalate, the application thickness of the coating solution onto the outside of the layer A was changed to 8.0 μm, the temperature and the draw ratio of the longitudinal stretching were changed to 135° C. and 5.0 times, the temperature and the draw ratio of the transverse stretching were changed to 135° C. and 6.0 times, the temperature of the heat treatment was changed to 200° C., and the other conditions were set at the same conditions as those in Example 7, a composite polyester film roll with a film thickness of 4.2 μm and a winding length of 25,000 m was prepared. Further, a magnetic tape with a width of 6.35 mm was made in a manner similar to that in Example 7.

The properties of the composite polyester film and magnetic tape obtained are shown in Table 3. Ra and Rz values of the surface B of the composite polyester film were 18 nm and 270 nm, respectively.

Example 9

In the production of the base film in Example 8, a composite polyester film roll with a film thickness of 4.2 μm and a winding length of 25,000 m was prepared in the same conditions as those in Example 8 other than a condition of removing silica contained in the raw material A. Further, a magnetic tape with a width of 6.35 mm was made in the same manner as that in Example 8.

The properties of the composite polyester film and magnetic tape obtained are shown in Table 3. Ra and Rz values of the surface B of the composite polyester film were 20 nm and 300 nm, respectively.

Example 10

In the production of the base film in Example 7, in a process after the longitudinal stretching, except the application to the outside of the layer A, a process for applying an aqueous solution having the following composition and concentration onto the outside of the layer B at a coating thickness of 1.0 μm.

| Aqueous coating solution onto the outside of layer B: | |
|---|---|
| Methyl cellulose: | 0.15 wt % |
| Water soluble polyester: | 0.20 wt % |
| Aminoethylsilane coupling agent: | 0.02 wt % |
| Polydimethylsiloxane: | 0.01 wt % |

Setting the other conditions at similar conditions in Example 7, a composite polyester film roll with a film thickness of 6.3 μm and a winding length of 20,000 m was prepared, and further, a magnetic tape with a width of 6.35 mm was made.

The properties of the composite polyester film and magnetic tape obtained are shown in Table 3. Ra and Rz values of the surface B of the composite polyester film were 13 nm and 230 nm, respectively.

After the obtained composite polyester film was left for 13 months under the same condition as that in Example 7, a magnetic tape was made in the same manner as that in Example 7 and DO was evaluated. The number of DO was 0/min. and the property of the magnetic tape was good.

Example 11

In the production of polyester due to titanium compound catalyst in Example 7, the content of ethylene glycol solution of 10 wt % diethylphosphono ethylacetate was changed so that the content of phosphorus at an atom equivalent relative to polymer to be obtained became 0.1 ppm, the polymerization was carried out setting the other conditions at the same conditions as those in Example 7, and a polyester with element contents shown in Table 3 was produced.

Using the obtained polyester as a polymer for the raw material B, and setting the other conditions at the same conditions as those in Example 7, a composite polyester film roll with a film thickness of 6.3 μm and a winding length of 20,000 m was prepared, and further, a magnetic tape with a width of 6.35 mm was made.

The properties of the composite polyester film and magnetic tape obtained are shown in Table 3. Ra and Rz values of the surface B of the composite polyester film were 13 nm and 230 nm, respectively.

Example 12

In the production of polyester due to titanium compound catalyst in Example 7, the content of ethylene glycol solution of 10 wt % diethylphosphono ethylacetate was changed so that the content of phosphorus at an atom equivalent relative to polymer to be obtained became 12 ppm, the polymerization was carried out setting the other conditions at the same conditions as those in Example 7, and a polyester with element contents shown in Table 3 was produced.

Using the obtained polyester as a polymer for the raw material B, and setting the other conditions at the same conditions as those in Example 7, a composite polyester film roll with a film thickness of 6.3 μm and a winding length of 20,000 m was prepared, and further, a magnetic tape with a width of 6.35 mm was made.

The properties of the composite polyester film and magnetic tape obtained are shown in Table 3. Ra and Rz values of the surface B of the composite polyester film were 13 nm and 230 nm, respectively.

Example 13

In the production of polyester due to titanium compound catalyst in Example 7, the content of citric acid chelate titanium compound used as polymerization catalyst was changed so that the content of titanium at an atom equivalent relative to polymer to be obtained became 3 ppm, and further, the content of ethylene glycol solution of 10 wt % diethylphosphono ethylacetate was changed so that the content of phosphorus at an atom equivalent relative to polymer to be obtained became 8 ppm, the polymerization was carried out setting the other conditions at the same conditions as those in Example 7, and a polyester with element contents shown in Table 3 was produced.

Using the obtained polyester as a polymer for the raw material B, and setting the other conditions at the same conditions as those in Example 7, a composite polyester film roll with a film thickness of 6.3 μm and a winding length of 20,000 m was prepared, and further, a magnetic tape with a width of 6.35 mm was made.

The properties of the composite polyester film and magnetic tape obtained are shown in Table 3. Ra and Rz values of the surface B of the composite polyester film were 13 nm and 230 nm, respectively.

Comparative Example 29

In the production of the base film in Example 7, the application thickness of the aqueous coating solution on the outside of the layer A was changed to 0.5 μm. Setting the other conditions at the same conditions as those in Example 7, a composite polyester film roll with a film thickness of 6.3 μm and a winding length of 20,000 m was prepared, and further, a magnetic tape with a width of 6.35 mm was made.

The properties of the composite polyester film and magnetic tape obtained are shown in Table 3. Ra and Rz values of the surface B of the composite polyester film were 13 nm and 230 nm, respectively.

Comparative Example 30

In the production of the base film in Example 7, the content of methylcellulose in the aqueous coating solution on the outside of the layer A was changed to 0.19 wt %. Setting the other conditions at the same conditions as those in Example 7, a composite polyester film roll with a film thickness of 6.3 μm and a winding length of 20,000 m was prepared, and further, a magnetic tape with a width of 6.35 mm was made.

The properties of the composite polyester film and magnetic tape obtained are shown in Table 3. Ra and Rz values of the surface B of the composite polyester film were 13 nm and 230 nm, respectively.

Comparative Example 31

In the production of the base film in Example 7, the polystyrene spheres contained in the raw material B was changed to polystyrene spheres with a diameter of 600 nm. Setting the other conditions at the same conditions as those in Example 7, a composite polyester film roll with a film thickness of 6.3 μm and a winding length of 20,000 m was prepared, and further, a magnetic tape with a width of 6.35 mm was made.

The properties of the composite polyester film and magnetic tape obtained are shown in Table 3. Ra and Rz values of the surface B of the composite polyester film were 30 nm and 500 nm, respectively.

Comparative Example 32

In the production of the base film in Example 7, instead of the polystyrene spheres contained in the raw material B, aluminum silicate with a mean particle diameter of 190 nm was used at a content of 1.5 wt %, setting the other conditions at the same conditions as those in Example 7, a composite polyester film roll with a film thickness of 6.3 μm and a winding length of 20,000 m was prepared, and further, a magnetic tape with a width of 6.35 mm was made.

The properties of the composite polyester film and magnetic tape obtained are shown in Table 3. Ra and Rz values of the surface B of the composite polyester film were 28 nm and 220 nm, respectively.

Comparative Example 33

In the production of the base film in Example 7, instead of the polystyrene spheres contained in the raw material B, aluminum silicate with a particle diameter of 40 nm was used at a content of 0.50 wt %, and setting the other conditions at the same conditions as those in Example 7, a composite polyester film roll with a film thickness of 6.3 μm and a winding length of 20,000 m was tried to be prepared. However, winding was greatly disturbed at the time of slitting, and a roll product the end surfaces of which were aligned properly could not be obtained. Even if a magnetic tape was made thereafter, because the yield for producing the tape was expected to be greatly reduced, the production of the magnetic tape was stopped.

The properties of the composite polyester film are shown in Table 3. Ra and Rz values of the surface B of the composite polyester film were 4 nm and 105 nm, respectively.

Comparative Example 34

In the production of the base film in Example 7, the content of the polystyrene spheres contained in the raw material B was changed to 0.005 wt %, and setting the other conditions at the same conditions as those in Example 7, a composite polyester film roll with a film thickness of 6.3 μm and a winding length of 20,000 m was tried to be prepared. However, wrinkles extending in the longitudinal direction entered over an area of about ⅔ of the width at the time of slitting, and even if a magnetic tape was made thereafter, because the yield for producing the tape was expected to be greatly reduced, the production of the magnetic tape was stopped.

The properties of the composite polyester film are shown in Table 3. Ra and Rz values of the surface B of the composite polyester film were 4 nm and 150 nm, respectively.

Comparative Example 35

A polymer raw material prepared by mixing the polyethylene terephthalate due to titanium compound catalyst prepared in Example 7, polyethylene terephthalate due to antimony catalyst and the polyethylene terephthalate due to germanium catalyst prepared in Example 7 was used as a polyester for the raw material B. The contents of elements in the mixture polymer raw material were shown in Table 3.

As the polyethylene terephthalate due to antimony catalyst, polyethylene terephthalate prepared by the following method was used. A usual antimony-group catalyst was used as the catalyst to be added in the polymerization process of polyethylene terephthalate, and polyethylene terephthalate with an IV of 0.66 was produced by a usual method (the atom content of titanium in the polyester was 0 ppm, the atom content of phosphorus was 10 ppm, the atom content of antimony was 80 ppm, and the atom content of germanium was 0 ppm).

In the production of the base film in Example 7, setting the same conditions as those in Example 7 other than a condition of changing the raw material B to the above-described mixture raw material, a composite polyester film roll with a film thickness of 6.3 μm and a winding length of 20,000 m was prepared, and further, a magnetic tape with a width of 6.35 mm was made.

The properties of the composite polyester film and magnetic tape obtained are shown in Table 3. Ra and Rz values of the surface B of the composite polyester film were 13 nm and 230 nm, respectively.

Comparative Example 36

In the production of polyester due to titanium compound catalyst in Example 7, the content of citric acid chelate titanium compound used as polymerization catalyst was changed so that the content of titanium at an atom equivalent relative to polymer to be obtained became 1 ppm, and further, the content of ethylene glycol solution of 10 wt % diethylphosphono ethylacetate was changed so that the content of phosphorus at an atom equivalent relative to polymer to be obtained became 1 ppm, the polymerization was carried out setting the other conditions at the same conditions as those in Example 7, and a polyester with element contents shown in Table 3 was produced.

Using the obtained polyester as a polymer for the raw material B, and setting the other conditions at the same conditions as those in Example 7, a composite polyester film roll with a film thickness of 6.3 μm and a winding length of 20,000 m was prepared, and further, a magnetic tape with a width of 6.35 mm was made.

The properties of the composite polyester film and magnetic tape obtained are shown in Table 3. Ra and Rz values of the surface B of the composite polyester film were 13 nm and 230 nm, respectively.

Comparative Example 37

In the production of polyester due to titanium compound catalyst in Example 7, the content of citric acid chelate titanium compound used as polymerization catalyst was changed so that the content of titanium at an atom equivalent relative to polymer to be obtained became 10 ppm, and further, the content of ethylene glycol solution of 10 wt % diethylphosphono ethylacetate was changed so that the content of phosphorus at an atom equivalent relative to polymer to be obtained became 6 ppm, the polymerization was carried out setting the other conditions at the same conditions as those in Example 7, and a polyester with element contents shown in Table 3 was produced.

Using the obtained polyester as a polymer for the raw material B, and setting the other conditions at the same conditions as those in Example 7, a composite polyester film roll with a film thickness of 6.3 μm and a winding length of 20,000 m was prepared, and further, a magnetic tape with a width of 6.35 mm was made.

The properties of the composite polyester film and magnetic tape obtained are shown in Table 3. Ra and Rz values of the surface B of the composite polyester film were 13 nm and 230 nm, respectively.

Comparative Example 38

In the production of the base film in Example 7, the polyester for the raw material B was changed to the polyester due to the antimony catalyst used in Comparative Example 35. Setting the other conditions at the same conditions as those in Example 7, a composite polyester film roll with a film thickness of 6.3 μm and a winding length of 20,000 m was prepared, and further, a magnetic tape with a width of 6.35 mm was made.

The properties of the composite polyester film and magnetic tape obtained are shown in Table 3. Ra and Rz values of the surface B of the composite polyester film were 13 nm and 230 nm, respectively.

Comparative Example 39

In the production of the base film in Example 7, the polyester for the raw material B was changed to the polyester due to the germanium catalyst produced in Example 7. Setting the other conditions at the same conditions as those in Example 7, a composite polyester film roll with a film thickness of 6.3 μm and a winding length of 20,000 m was prepared, and further, a magnetic tape with a width of 6.35 mm was made.

The properties of the composite polyester film and magnetic tape obtained are shown in Table 3. Ra and Rz values of the surface B of the composite polyester film were 13 nm and 230 nm, respectively.

TABLE 3

| | Properties of polyester film | | | | | | Particle contained in layer B | | Property of DVC tape | |
| --- | --- | --- | --- | --- | --- | --- | --- | --- | --- | --- |
| | Roughness of surface A | Content of element in polyester forming layer B | | | | | Particle | | Number of DO | |
| | | | | | | | | | | After repeated regeneration of |
| | Ra (nm) | Ti (ppm) | P (ppm) | Ti/P | Sb (ppm) | Ge (ppm) | diameter (nm) | Content (wt %) | First time (number/minute) | 100 times (number/minute) |
| Example 7 | 2.2 | 5 | 5 | 1.0 | 0 | 0 | 320 | 0.50 | 0 | 0 |
| Example 8 | 1.8 | 5 | 5 | 1.0 | 0 | 0 | 320 | 0.50 | 0 | 0 |
| Example 9 | 1.5 | 5 | 5 | 1.0 | 0 | 0 | 320 | 0.50 | 0 | 0 |
| Example 10 | 2.2 | 5 | 5 | 1.0 | 0 | 0 | 320 | 0.50 | 0 | 0 |
| Example 11 | 2.2 | 5 | 0.1 | 50 | 0 | 0 | 320 | 0.50 | 5 | 5 |
| Example 12 | 2.2 | 5 | 12 | 0.4 | 0 | 0 | 320 | 0.50 | 6 | 6 |
| Example 13 | 2.2 | 3 | 8 | 0.4 | 0 | 0 | 320 | 0.50 | 4 | 5 |
| Comparative Example 29 | 0.3 | 5 | 5 | 1.0 | 0 | 0 | 320 | 0.50 | 0 | 10 |
| Comparative Example 30 | 4.5 | 5 | 5 | 1.0 | 0 | 0 | 320 | 0.50 | 10 | 10 |
| Comparative Example 31 | 2.2 | 5 | 5 | 1.0 | 0 | 0 | 600 | 0.50 | 9 | 9 |
| Comparative Example 32 | 2.2 | 5 | 5 | 1.0 | 0 | 0 | 190 | 1.50 | 8 | 8 |
| Comparative Example 33 | 2.2 | 5 | 5 | 1.0 | 0 | 0 | 40 | 0.50 | — | — |
| Comparative Example 34 | 2.2 | 5 | 5 | 1.0 | 0 | 0 | 320 | 0.005 | — | — |
| Comparative Example 35 | 2.2 | 5 | 5 | 1.0 | 4 | 4 | 320 | 0.50 | 10 | 10 |
| Comparative Example 36 | 2.2 | 1 | 1 | 1.0 | 0 | 0 | 320 | 0.50 | 12 | 14 |
| Comparative Example 37 | 2.2 | 10 | 6 | 1.7 | 0 | 0 | 320 | 0.50 | 11 | 12 |
| Comparative Example 38 | 2.2 | 0 | 10 | 0 | 80 | 0 | 320 | 0.50 | 23 | 25 |
| Comparative Example 39 | 2.2 | 0 | 10 | 0 | 0 | 40 | 320 | 0.50 | 21 | 25 |

As shown in table 3, in the polyester film according to the third aspect, even if a polyester film formed as along roll product with a winding length of 15,000 m or more is used as a base film and a magnetic tape is produced by deposition at a increased deposition speed, precipitation of polyester decomposed substances from film surface B does not occur, a cooling can, is not soiled, and further, even if the lead time from the film production to vacuum deposition becomes long to be 3 months or more, a magnetic tape having a good electromagnetic conversion property and less dropout can be produced. In particular, it is effective as a base film for a recording medium for recording digital data such as a digital video tape.

INDUSTRIAL APPLICATIONS

Our films can be applied particularly to improve the quality and performance of a ferromagnetic metal thin layer-type magnetic recording medium for recording digital data such as a digital video cassette tape, a data storage tape, etc.

The invention claimed is:

1. A polyester film for recording medium, having one major surface thereof provided with a coating layer containing fine particles with a particle diameter of 5 to 50 nm and an organic compound, wherein a number of fine surface projections existing on a surface of said coating layer is in a range of 3 million to 7 million/mm$^2$, and a number of surface defects with a height of 120 nm or greater attributed to foreign matter attributed to a catalyst, contained in said film is 15/100 cm$^2$ to 30/100 cm$^2$, and wherein a polyester of said polyester film contains 1) a titanium compound at a content of 2 to 6 ppm as a titanium atom equivalent relative to polyester and a phosphorus compound at a content of 0.2 to 9 ppm as a phosphorus atom equivalent relative to polyester, and a ratio of a content of said titanium compound to a content of said phosphorus compound is in a range of 0.7 to 10 at a molar ratio (Ti/P) of titanium atom to phosphorus atom, and not having a particle shape of titanium dioxide, and 2) 0 ppm of antimony and 0 ppm of germanium.

2. The polyester film for recording medium according to claim 1, wherein a thickness of said film is less than 9.0 μm.

3. The polyester film for recording medium according to claim 1, wherein said polyester is polyethylene terephthalate or polyethylene-2,6-naphthalate.

4. The polyester film for recording medium according to claim 1, wherein said film is used for a magnetic tape of a digital recording system.

5. A magnetic recording tape wherein a ferromagnetic metal thin layer is provided on a surface of said coating layer of said polyester film according to claim 1.

6. The polyester film of claim 1, wherein a surface roughness, Ra, of the coating layer is 0.5-4.0 nm.

7. The polyester film of claim 1, wherein the phosphorous compound is at a content of 2 to 6 ppm.

* * * * *